(12) United States Patent
Yamauchi et al.

(10) Patent No.: US 8,035,758 B2
(45) Date of Patent: Oct. 11, 2011

(54) IMAGE DISPLAY APPARATUS WITH LIGHT PATH SEPARATION TO RETURN A POLARIZED LIGHT COMPONENT

(75) Inventors: Yu Yamauchi, Utsunomiya (JP); Hiroyuki Kodama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 466 days.

(21) Appl. No.: 11/865,540

(22) Filed: Oct. 1, 2007

(65) Prior Publication Data

US 2008/0079872 A1 Apr. 3, 2008

(30) Foreign Application Priority Data

Oct. 2, 2006 (JP) ................... 2006-270658

(51) Int. Cl.
*G02F 1/1335* (2006.01)
*G03B 21/14* (2006.01)
*G03B 21/26* (2006.01)

(52) U.S. Cl. ............. 349/9; 349/5; 349/6; 349/7; 349/8; 353/30; 353/34; 353/82

(58) Field of Classification Search ............... 349/5–9; 352/30, 34, 82
See application file for complete search history.

(56) References Cited

U.S. PATENT DOCUMENTS

| | | | |
|---|---|---|---|
| 6,626,540 B2 | 9/2003 | Ouchi et al. | |
| 6,648,474 B2 * | 11/2003 | Katsumata et al. | 353/20 |
| 6,831,706 B2 * | 12/2004 | Abe et al. | 349/8 |
| 6,926,411 B2 | 8/2005 | Ouchi et al. | |
| 6,961,179 B2 * | 11/2005 | Chen et al. | 359/485 |
| 7,044,607 B2 | 5/2006 | Ouchi et al. | |
| 2002/0036752 A1 | 3/2002 | Lin | |
| 2002/0097382 A1 * | 7/2002 | Suzuki et al. | 353/31 |
| 2005/0018308 A1 * | 1/2005 | Cassarly et al. | 359/630 |
| 2006/0119951 A1 | 6/2006 | McGuire | |

FOREIGN PATENT DOCUMENTS

| | | |
|---|---|---|
| EP | 898194 | 2/1999 |
| EP | 1008895 | 6/2000 |
| JP | 2001-154152 | 6/2001 |

* cited by examiner

*Primary Examiner* — Hoan C Nguyen
(74) *Attorney, Agent, or Firm* — Canon U.S.A., Inc., IP Division

(57) ABSTRACT

An image display apparatus includes a polarization conversion element which converts second color light of unpolarized light emitted from a light source into a first linear polarized light, and a light path separation element which separates the second color light emitted from the first and third color light; and performs image display by illuminating a first, a second and a third liquid crystal display elements with the first, second and third color light that pass through the light path separation element, wherein the light path separation element leads a first linear polarized light component of the second color light to the second liquid crystal display element, and wherein the light path separation element leads a second linear polarized light component whose direction of polarization is orthogonal to the first linear polarized light component of the second color light, in a direction different from any of the liquid crystal display elements.

9 Claims, 24 Drawing Sheets

FIG. 22

FILM CONFIGURATION

| | 332 | 334 |
|---|---|---|
| GLASS MATERIAL | PBH56 | PBH56 |
| 1 | 208.53H | 213.57M |
| 2 | 53.96L | 96.66H |
| 3 | 77.5H | 197.2M |
| 4 | 33.21L | 80.64H |
| 5 | 65.16H | 223.3M |
| 6 | 115.14L | 45.88H |
| 7 | 40.28H | 231.79M |
| 8 | 143.82L | 103.53H |
| 9 | 40.05H | 19.65L |
| 10 | 143.39L | 142.36H |
| 11 | 32.47H | 22.84L |
| 12 | 19.82L | 27.06H |
| 13 | 193.21H | 22.67L |
| 14 | 65.06M | 266.39H |
| 15 | 104.51H | 26.69L |
| 16 | 57.47M | 158.66H |
| 17 | 213.3H | 38.31L |
| 18 | 255.08M | 137.67H |
| | ADHESIVE | ADHESIVE |

| H | M | L |
|---|---|---|
| $TiO_2$ | $Al_2O_3$ | $SiO_2$ |

IMAGE DISPLAY APPARATUS WITH LIGHT PATH SEPARATION TO RETURN A POLARIZED LIGHT COMPONENT

BACKGROUND OF THE INVENTION

1. Field of the Invention

The present invention relates to an image display apparatus using a liquid crystal display element (particularly, reflective liquid crystal display element) such as a liquid crystal panel.

2. Description of the Related Art

An image projection device performs color separation and color composition by a polarizing beam splitter. The image projection device discussed in U.S. Pat. No. 6,626,540 divides unpolarized light emitted from a light source into a plurality of beams by a lens array to form a plurality of secondary light source images with each beam. The beams from the secondary light source image are superimposed on a liquid crystal panel by a condenser lens to illuminate the liquid crystal panel with nearly uniform brightness.

Each divided beam emitted from the lens array is incident on a plurality of polarization conversion cells corresponding to each lens cell of the lens array provided in a polarization conversion element. Each polarization conversion cell includes a polarization separation film, a ½ wavelength plate and a reflection plane. The unpolarized light incident on each polarization conversion cell is separated into P polarized light and S polarized light by the polarization separation film. The P polarized light passes through the polarization separation film. The ½ wavelength plate rotates polarization of P polarized light at 90 degrees. The P polarized light is emitted as the S polarized light.

On the other hand, S polarized light is reflected by the polarization separation film. The S polarized light reflects off a reflection plane and is emitted while it remains S polarized. The S polarized light whose direction of polarization is made uniform, is emitted from the polarization conversion element and is incident on the condenser lens.

Generally, in the polarization conversion element, it is difficult to convert the unpolarized light emitted from a light source having a limited size into linear polarized light with efficiency of 100%. For this reason, a polarizing plate is placed after the polarization conversion element to remove unnecessary polarized light. While such a polarizing plate has a function of removing the unnecessary light, the polarizing plate shields light having a normal direction of polarization (light having a desired direction of polarization) by 10% or more. Therefore, a projected image becomes slightly dark.

The polarization conversion element uniformly converts the direction of polarization of light to S polarized light. The S polarized light is separated into light in a red and a blue wavelength band, and light in a green wavelength band by a dichroic element. At this stage, the light in the red and the blue wavelength bands follows the same light path and has the same direction of polarization. Then, the light is passed through a wavelength (color) selective phase difference plate to lead each of the light in the red and the blue wavelength bands, to a red and a blue liquid crystal panel respectively using a polarizing beam splitter.

The wavelength selective phase difference plate converts the passing light in the red and the blue wavelength bands into light having the different direction of polarization respectively. Thus, an image projection device using the polarizing beam splitter generally employs a polarization conversion element placed close to a lens array, a polarizing plate, a dichroic element, a wavelength selective phase difference plate, and a polarizing beam splitter.

In the above-described configuration, in order to enhance the degree of polarization of illumination light incident on a liquid crystal panel, the polarizing plate needs to be arranged. However, when the polarizing plate is placed, an amount of the illumination light is reduced. On the contrary, in order to prevent reduction of the amount of the illumination light, it is considered to remove the polarizing plate. However, if the polarizing plate is removed, for example, light having the direction of polarization opposite to a desired direction is incident on a green liquid crystal panel, and light in a green wavelength band is incident on a red and a blue liquid crystal panel. In that case, green light having high spectral luminous efficiency is projected onto a screen. That projection of the green light reduces the contrast of an image. Further, the red light and the blue light may be incident on other liquid crystal panel than the liquid crystal panel corresponding to each of the red light and the blue light. Furthermore, the light having the direction of polarization different from the desired direction may be incident on the liquid crystal panel, which causes a reduction in contrast.

SUMMARY OF THE INVENTION

The present invention is directed to an image display apparatus using a liquid crystal display element (particularly, reflective liquid crystal display element) such as a liquid crystal panel.

According to an aspect of the present invention, an image display apparatus includes a first liquid crystal display element corresponding to first color light; a second liquid crystal display element corresponding to second color light different in wavelength band from the first color light; a third liquid crystal display element corresponding to third color light different in wavelength band from the first color light and the second color light; a polarization conversion element which converts the second color light of unpolarized light emitted from a light source into first linear polarized light; and a light path separation element which separates the second color light from the first and third color light which are emitted from the polarization conversion element, wherein an image is displayed by illuminating the first, the second and the third liquid crystal display elements with the first, the second and the third color light emitted from the light source and passed through the light path separation element, wherein the light path separation element leads a first linear polarized light component of the second color light to the second liquid crystal display element, and wherein the light path separation element leads the light of a second linear polarized light component whose direction of polarization is orthogonal to the first linear polarized light component of the second color light, in a direction different from any of the first, the second and the third liquid crystal display elements.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 22 is a block diagram illustrating a first and a second light separation films as a multilayer film.

DETAILED DESCRIPTION OF THE EMBODIMENTS

Various exemplary embodiments, features, and aspects of the invention will be described in detail below with reference to the drawings.

The exemplary embodiment of the present invention relates to an image display apparatus using a liquid crystal display element (particularly, reflective liquid crystal display element) such as a liquid crystal panel. Particularly, the exemplary embodiment of the present invention is applied to an image display apparatus which performs color separation, color composition, and light analysis using a polarizing beam splitter (polarization separation element).

The exemplary embodiment of the present invention provides an image display apparatus capable of enhancing a contrast while suppressing a reduction in a light quantity.

First Exemplary Embodiment

Figure 1:
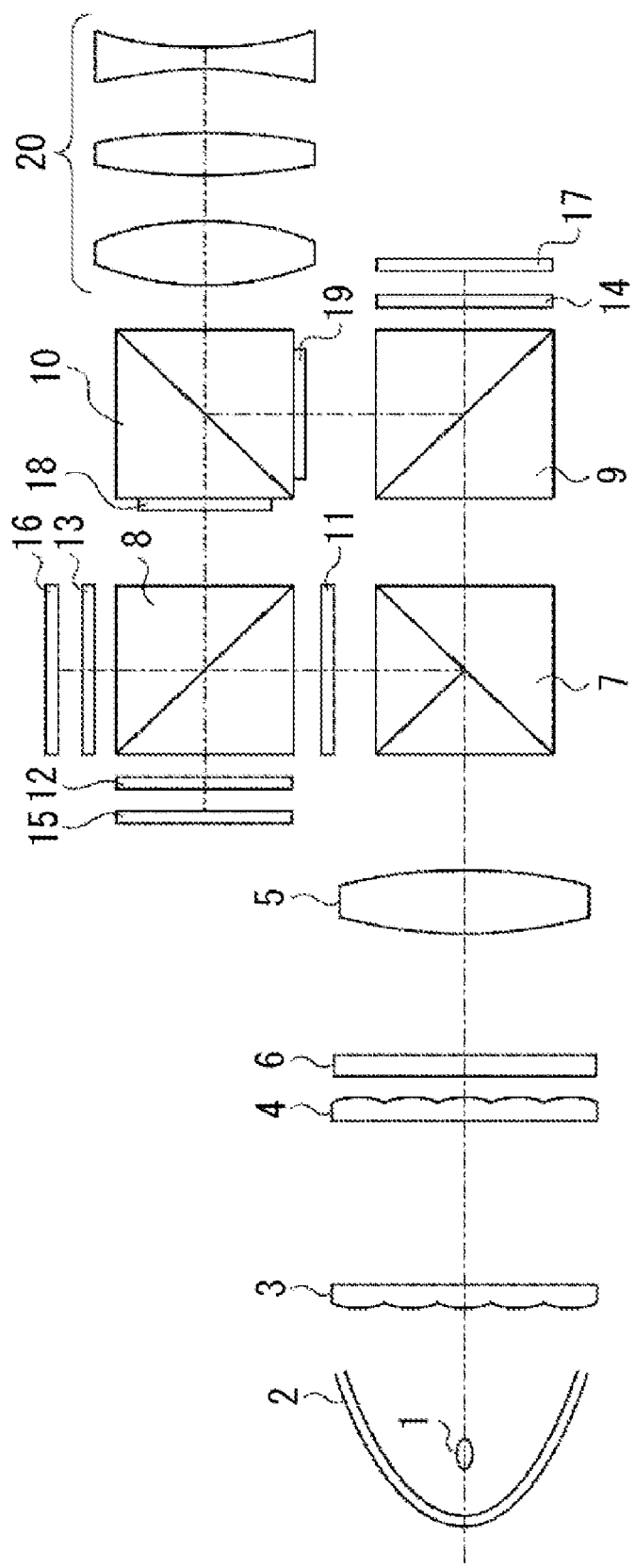
FIG. 1 illustrates an optical system according to a first exemplary embodiment of the present invention.
Figure 2:
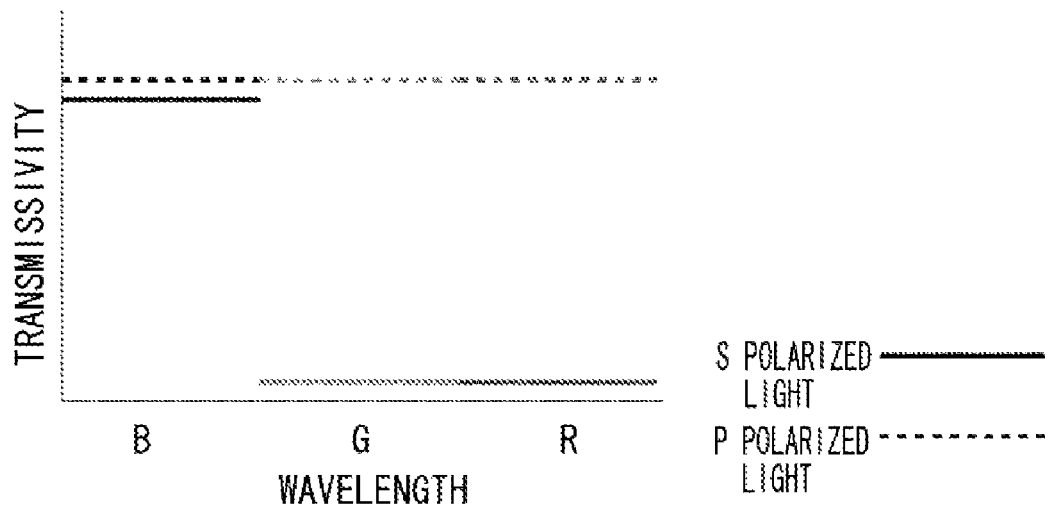
FIG. 2 illustrates the characteristic of a dichroic polarizing prism.

FIG. 1 illustrates an optical system according to a first exemplary embodiment of the present invention. In FIG. 1, the optical system includes a light source 1, a reflector 2, a first lens array 3 formed of a plurality of lenses, a second lens array 4 formed of a plurality of lenses, a condenser lens 5, a polarization conversion element 6, a 3P dichroic polarizing prism 7, a first polarizing beam splitter 8, a second polarizing beam splitter 9, a dichroic polarizing prism 10, a color selective phase plate 11, phase plates 12, 13 and 14, reflective liquid crystal display elements (transmissive type is acceptable) 15, 16 and 17, a polarizing plate 18, a polarizing plate 19, and a projection lens 20. The polarization conversion element 6 uniformly converts unpolarized light emitted from a light source to predetermined linear polarized light. The 3P dichroic polarizing prism 7 has a color separation function and a light analysis function. The dichroic polarizing prism 10 has a characteristic illustrated in FIG. 2 which reflects the light in a green wavelength band (G), passes the light in a blue wavelength band (B), reflects the unnecessary polarized light component in a red wavelength band (R) and passes projection light in the red wavelength band (R). The color selective phase plate 11 converts the direction of polarization of the red wavelength band (R) at 90 degrees and does not convert the direction of polarization of the blue wavelength band (B). The phase plates 12, 13 and 14 are optimized to the wavelength of illumination light. The reflective liquid crystal display elements (transmissive type is acceptable) 15, 16 and 17 display the image in the red (R), the blue (B) and the green (G) wavelength bands, and each of the display elements is a liquid crystal panel corresponding to red light, blue light and green light respectively. The polarizing plate 18 exclusively analyzes the blue wavelength band (B).

The wavelength band (B) refers to approximately blue light having a wavelength of not less than 400 nm and not more than 500 nm, the wavelength band (G) refers to approximately green light having a wavelength of not less than 500 nm and not more than 600 nm, and the wavelength band (R) refers to approximately red light having a wavelength of not less than 500 nm and not more than 600 nm.

White light of polarization converted by the polarization conversion element 6 (i.e., P polarized light with respect to the film of a polarizing beam splitter) and unnecessary light not subjected to polarization conversion (i.e., S polarized light with respect to the film of a polarizing beam splitter) are incident on the 3P dichroic polarizing prism 7. The unnecessary light not subjected to polarization conversion is cut by the 3P dichroic polarizing prism 7. The configuration and optical function of the 3P dichroic polarizing prism 7 will be described in detail later.

On the other hand, the red wavelength band (R) of P polarized light subjected to polarization conversion reflects off the 3P dichroic polarizing prism 7. The color selective phase plate 11 rotates the polarization of the red wavelength band (R) which is converted into S polarized light. Then, the red wavelength band (R) reflects off the first polarizing beam splitter 8 and passes through the phase plate 12 for the red wavelength band (R) to illuminate the reflective liquid crystal display element 15 for the red wavelength band (R). The reflective liquid crystal display element 15 modulates the polarization of the light based on the image of the red wavelength band (R). The modulated light passes through the first polarizing beam splitter 8 and the dichroic polarizing prism 10 to reach the projection lens 20.

Next, the P polarized light component in the blue wavelength band (B) reflects off the 3P dichroic polarizing prism 7, passes through the first polarizing beam splitter 8 and the phase plate 13 for the blue wavelength band (B) to illuminate the reflective liquid crystal display element 16 for the blue wavelength band (B). The reflective liquid crystal display element 16 for the blue wavelength band (B) modulates the polarization of the light based on the image of the blue wavelength band (B). The modulated light reflects off the first polarizing beam splitter 8, is analyzed by the polarizing plate 18 for the blue wavelength band (B) and passes through the dichroic polarizing prism 10 to reach the projection lens 20.

On the other hand, the P polarized light component in the green wavelength band (G) passes through the 3P dichroic polarizing prism 7, the second polarizing beam splitter 9 and the phase plate 14 for green wavelength band (G). Then, the P polarized light component illuminates the reflective liquid crystal display element 17 for green wavelength band (G). The reflective liquid crystal display element 17 for the green wavelength band (G) modulates the polarization of the light based on the image of the green wavelength band (G). The modulated light reflects off the second polarizing beam splitter 9, is analyzed by the polarizing plate 19 for the green wavelength band (G) and reflects off the dichroic polarizing prism 10 to reach the projection lens 20.

Figure 3:
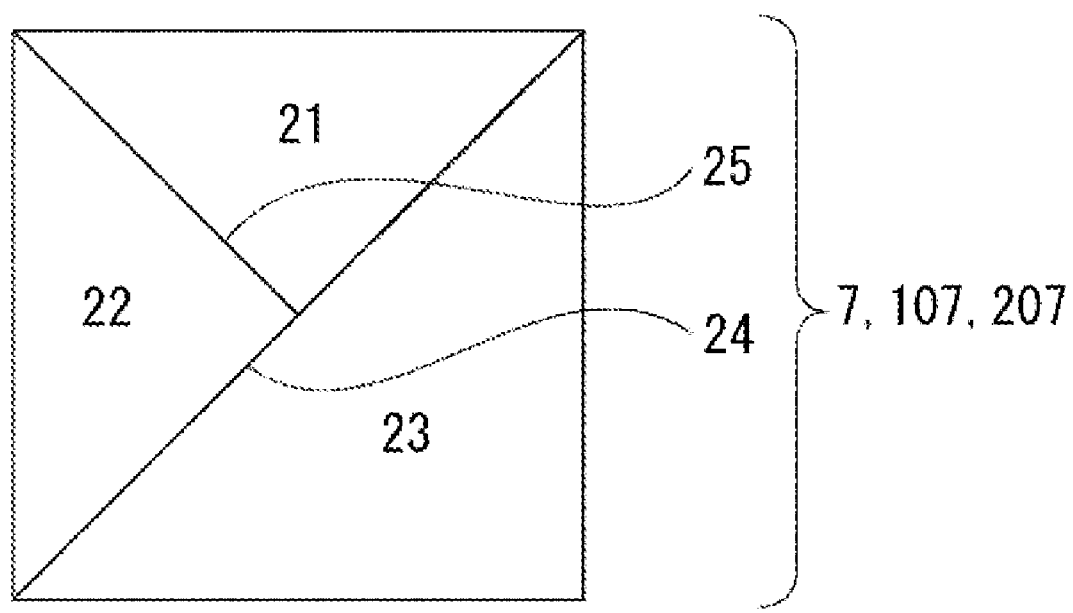
FIG. 3 is a diagram illustrating a 3P dichroic polarizing prism according to a first exemplary embodiment of the present invention.
Figure 4:
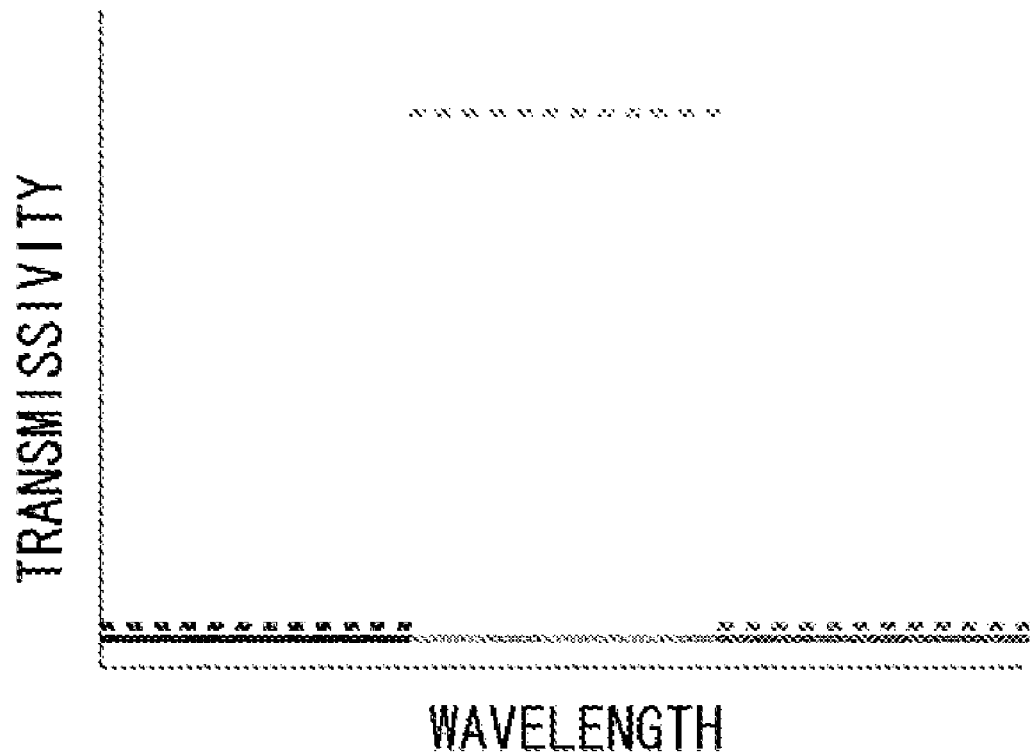
FIG. 4 illustrates the characteristic of the film A of a 3P dichroic polarizing prism according to a first exemplary embodiment of the present invention.
Figure 5:
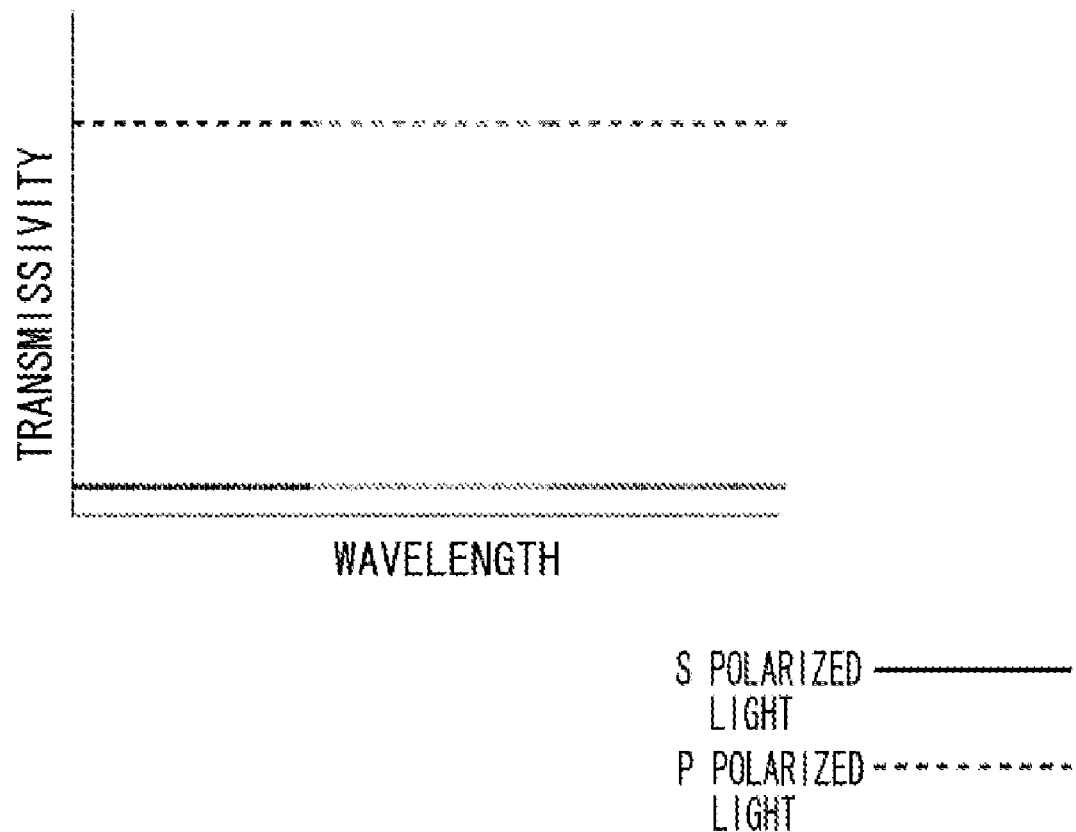
FIG. 5 illustrates the characteristic of the film B of a 3P dichroic polarizing prism according to a first exemplary embodiment of the present invention.

Next, the configuration and optical action of the above-described 3P dichroic polarizing prism 7 will be described in detail referring to FIGS. 3 to 5. As illustrated in FIG. 3, the 3P dichroic polarizing prism 7 is configured of combination of three triangular prisms 21, 22 and 23, and includes two films 24 (hereafter, referred to as film A) and 25 (hereafter, referred to as film B). The characteristic of the film A 24 and the film B 25 is illustrated in FIGS. 4 and 5. The 3P dichroic polarizing prism (prism body) 7 includes three prisms, that is, the first prism 21, the second prism 22, and the third prism 23. The first prism 21 and the second prism 22 have the same prism shape. The third prism 23 has the same shape as the first prism 21 and the second prism 22 combined. The film B 25 (first optical structure) is formed between the first prism 21 and the second prism 22. The film A 24 (second optical structure) is formed between the first prism 21 and third prism 23, and between the second prism 22 and the third prism 23. The film A 24 is different in characteristic from the film B 25.

Further, the first prism 21 and the second prism 22 have planes in shape of a right-angled isosceles triangle. The planes are of the same size. The third prism 23 also has a plane in shape of a right-angled isosceles triangle. The plane of the third prism 23 is of a size different from the first prism 21 and the second prism 22. Then, the first prism 21 and the second prism 22 are bonded together to join their right-angled portions together. The right-angled portions of the first prism 21 and the second prism 22, and the hypotenuse part of the third prism 23 are bonded together. In other words, the planes that sandwich the right angle of the first prism 21 and the second prism 22 are bonded together. The 3P dichroic polarizing prism 7 is formed by bonding together the plane of the hypotenuse of the right-angled isosceles triangle formed by the prisms 21 and 22, and the plane of the hypotenuse of the third prism 23. Note that bonding of the prisms can be performed in any order.

Figure 6:
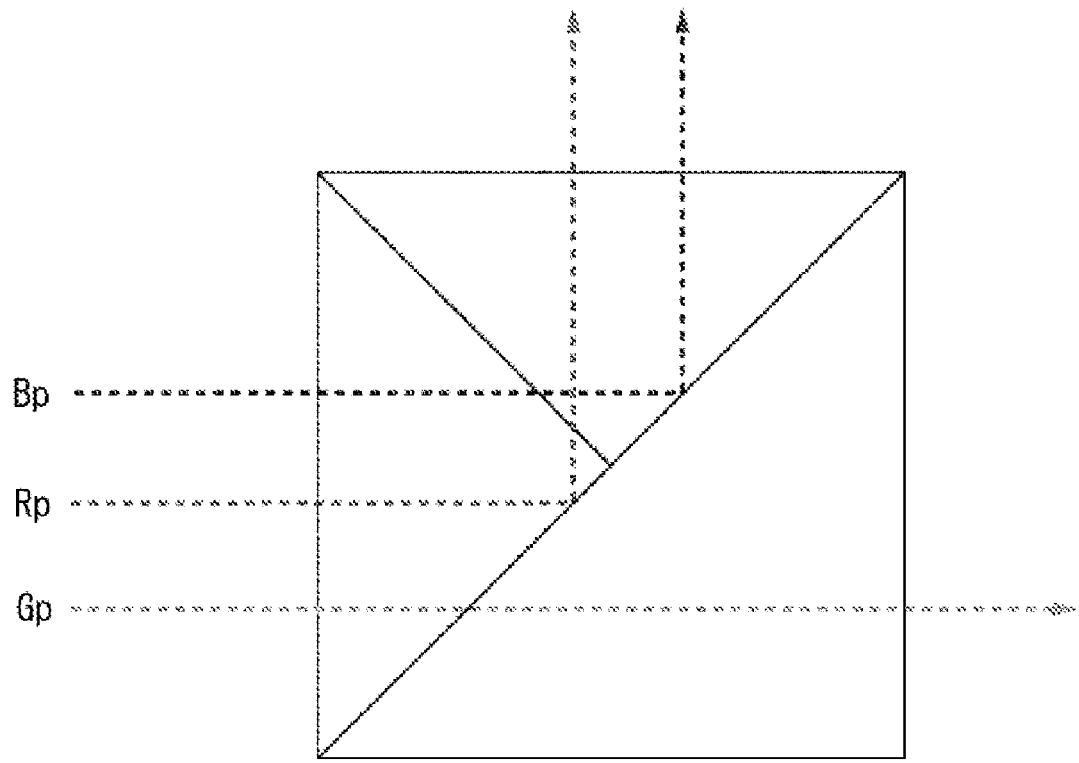
FIG. 6 illustrates a path of normal light in the 3P dichroic polarizing prism according to a first exemplary embodiment of the present invention.

First, P polarized light that is white light subjected to polarization conversion will be described. As illustrated in FIGS. 4 and 5, light in a blue wavelength band (B) and a red wavelength band (R) reflect off the film A 24 and pass through the film B 25. Accordingly, as illustrated in FIG. 6, the light in the blue wavelength band (B) and the red wavelength band (R) reflect off the 3P dichroic polarizing prism 7. On the other hand, as illustrated in FIGS. 4 and 5, light in a green wavelength band (G) passes through both the film A 24 and the film B 25. Accordingly, as illustrated in FIG. 6, the light in the green wavelength band (G) passes through the 3P dichroic polarizing prism 7.

Figure 7:
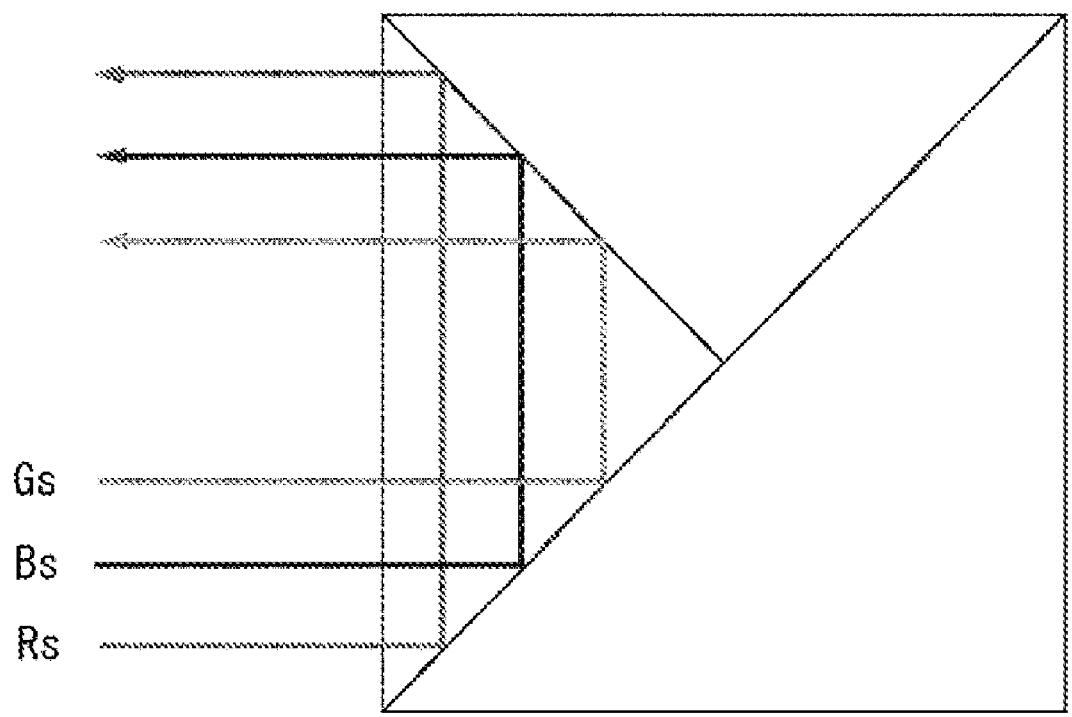
FIG. 7 illustrates a path of unnecessary light in a 3P dichroic polarizing prism according to a first exemplary embodiment of the present invention.

Next, it is described why S polarized light that is unnecessary and not subjected to polarization conversion, is cut (i.e., does not reach a liquid crystal display element). As illustrated in FIGS. 4 and 5, the entire band of S polarized light shows a reflection characteristic in both the film A 24 and the film B 25. Accordingly, as illustrated in FIG. 7, S polarized light (i.e., unnecessary light) reflects off both the film A 24 and the film B 25, and returns to the light source 1. In such a manner, S polarized light does not reach the liquid crystal display element (i.e., a light quantity which reaches the liquid crystal display element can be reduced). Therefore, contrast of an image display apparatus can be enhanced.

As described above, the 3P dichroic polarizing prism 7 simultaneously performs light analysis and color separation. Accordingly, a polarizing plate is not required. Conventionally, the polarizing plate is provided in the light path of the red wavelength band (R) and the blue wavelength band (B). Accordingly, a projector can be realized in which the light quantity of the blue wavelength band (B) and the red wavelength band (R) is increased so that in a normal mode, the high quality of a bright and white tint is achieved. Therefore, a bright cinema mode can be realized in the cinema mode. If the cinema mode is too bright, the light quantity of the light source 1 can be reduced. As a result, the airflow of the cooling fan can be reduced and a silence effect is obtained.

On the other hand, in the light path of the green wavelength band (G), the light analysis is conventionally performed only by the second polarizing beam splitter 9. However, according to the exemplary embodiment, the light analysis is performed also in the 3P dichroic polarizing prism 7. Accordingly, a contrast is enhanced as compared with a conventional prism.

In the exemplary embodiment of the present invention (and in a second and a third exemplary embodiments), the unnecessary light is returned in a direction of the light source 1. However, the direction of returning the unnecessary light is not limited to this. As long as the unnecessary light is not incident on any liquid crystal display element, the unnecessary light can also be returned in a direction other than that of the light source 1. More specifically, it is not necessary to provide the film B 25 to form an angle of 90 degrees with the film A 24. An angle between the film A 24 and the film B 25 can be not less than 60 degrees and not more than 120 degrees (more adequately not less than 80 degrees and not more than 100 degrees).

Further, in the exemplary embodiment of the present invention, it is adequate that a polarizing plate is not placed between the 3P dichroic polarizing prism 7 and the first polarizing beam splitter 8, and between the 3P dichroic polarizing prism 7 and the second polarizing beam splitter 9. That is, it is adequate that a beam emitted from the 3P dichroic polarizing prism 7 is incident on the first and the second polarizing beam splitters 8 and 9 (or reflective liquid crystal display elements) without going through a polarizing plate. Such a configuration can enhance a contrast without reducing brightness so much.

However, in the exemplary embodiment of the present invention, a polarizing plate can be placed between the 3P dichroic polarizing prism 7 and the first polarizing beam splitter 8, and between the 3P dichroic polarizing prism 7 and the second polarizing beam splitter 9. Even if the polarizing plate is placed in such a manner, an effect of increasing a contrast can be achieved.

Further, a trimming filter (filter to reflect or absorb light having a specific wavelength) can be inserted between the 3P dichroic polarizing prism 7, and the first and the second polarizing beam splitters 8 and 9 (i.e., reflective liquid crystal display elements). Thus, the amount of red light and blue light incident on the liquid crystal display element for a green wavelength band (G), and green light incident on the liquid crystal display element for a red wavelength band (R) and a blue wavelength band (B) can be reduced. In such a manner, the contrast can be increased and the deterioration of a tint can be prevented.

Second Exemplary Embodiment

Figure 8:
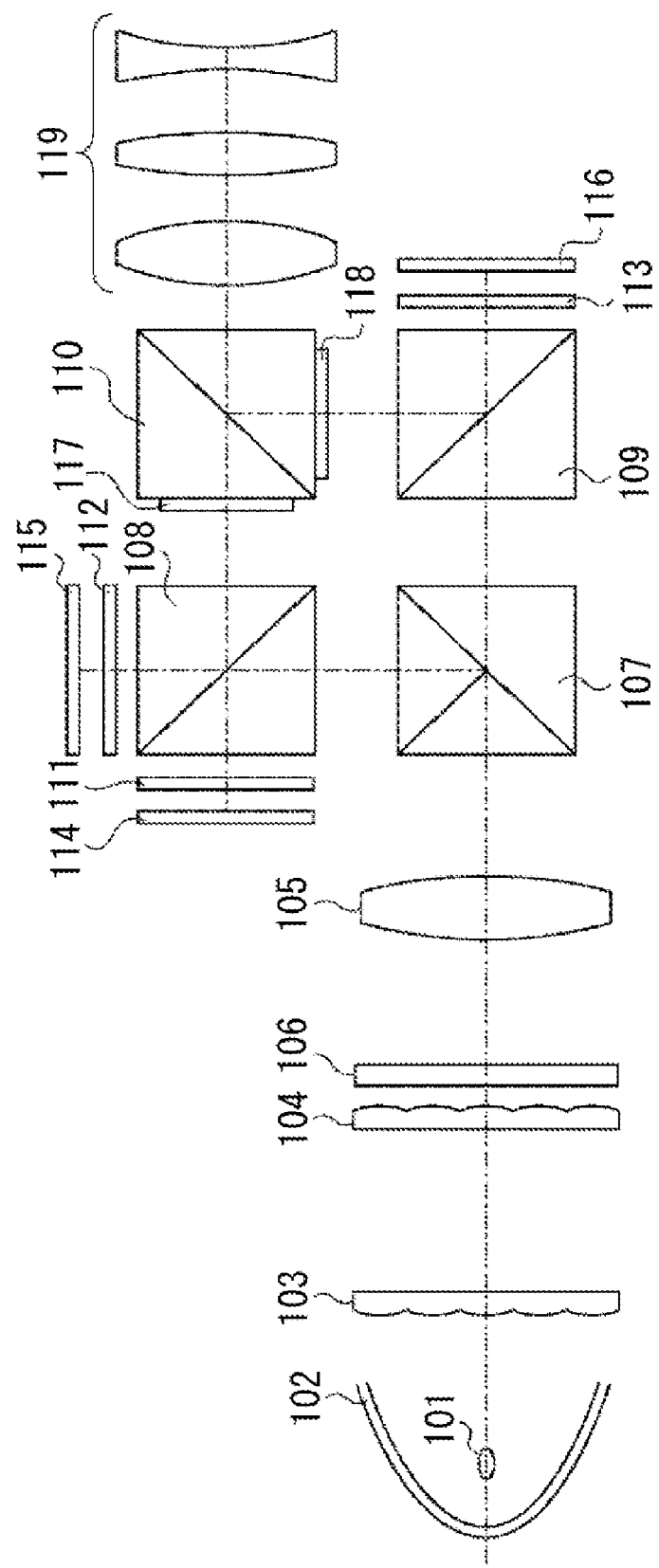
FIG. 8 is a diagram illustrating an optical system according to a second exemplary embodiment of the present invention.

FIG. 8 illustrates an optical system according to a second exemplary embodiment of the present invention. In FIG. 8, the optical system includes a light source 101, a reflector 102, a first lens array 103 formed of a plurality of lenses, a second lens array 104 formed of a plurality of lenses, a condenser lens 105, a color selective polarization conversion element 106, a 3P dichroic polarizing prism 107, a first polarizing beam splitter 108, a second polarizing beam splitter 109, a dichroic polarizing prism 110, phase plates 111, 112 and 113, reflective liquid crystal display elements 114, 115 and 116, a blue wavelength band (B) exclusive polarizing plate 117, a polarizing plate 118, and a projection lens 119. The color selective polarization conversion element 106 uniformly converts the red wavelength band (R) of white unpolarized light to S polarized light (i.e., converts to S polarized light with respect to the film of a polarizing beam splitter). The color selective polarization conversion element 106 also uniformly converts the blue wavelength band (B) and the green wavelength band (G) to P polarized light (i.e., converts to P polarized light with respect to the film of a polarizing beam splitter). The 3P dichroic polarizing prism 107 has a color separation function and a light analysis function. The dichroic polarizing prism 110 has a characteristic illustrated in FIG. 2 which reflects the light of the green wavelength band (G), passes the light of the blue wavelength band (B), reflects the unnecessary polarized light component of the light in the red wavelength band (R), and passes the projection light in the red wavelength band (R). The phase plates 111, 112 and 113 are optimized to the wavelength of illumination light. The reflective liquid crystal display elements 114, 115 and 116 display the image of the red wavelength band (R), the blue wavelength band (B), and the green wavelength band (G). The polarizing plate 117 exclusively analyzes the blue wavelength band (B).

The configuration and optical action of the color selective polarization conversion element 106 will be described in detail lastly in description of the exemplary embodiment.

The red wavelength band (R) converted into S polarized light by the color selective polarization conversion element 106; the blue wavelength band (B) and the green wavelength band (G) converted into P polarized light; and P polarized light in the red wavelength band (R), S polarized light in the blue wavelength band (B) and the green wavelength band (G), which are unnecessary light and not subjected to polarization conversion, are incident on the 3P dichroic polarizing prism 107. The S polarized light in the blue wavelength band (B) and the green wavelength band (G), which are not subjected to polarization conversion, is cut by the 3P dichroic polarizing prism 107. Further, the P polarized light in the red wavelength band (R) passes through the 3P dichroic polarizing prism 107 to the light path of the green wavelength band (G).

On the other hand, the red wavelength band (R) of S polarized light, which is subjected to polarization conversion, reflects off the 3P dichroic polarizing prism 107, reflects off the first polarizing beam splitter 108 and passes through the phase plate 111 for the red wavelength band (R) to illuminate the reflective liquid crystal display element 114. The reflective liquid crystal display element 114 of red wavelength band (R) modulates polarization of the light based on the image of the red wavelength band (R). The modulated light passes through the first polarizing beam splitter 108 and the dichroic polarizing prism 110 to reach the projection lens 119.

Next, a P polarized light component in the blue wavelength band (B) reflects off the 3P dichroic polarizing prism 107, passes through the first polarizing beam splitter 108, then passes through the phase plate 112 for the blue wavelength band (B) to illuminate the reflective liquid crystal display elements 115 of the blue wavelength band (B). The reflective liquid crystal display element 115 of the blue wavelength band (B) modulates polarization of the light based on the image of the blue wavelength band (B). The modulated light reflects off the first polarizing beam splitter 108, is subjected to light analysis by the polarizing plate 117 of the blue wavelength band (B) and passes through the dichroic polarizing prism 110 to reach the projection lens 119.

A P polarized light component in the green wavelength band (G) passes through the 3P dichroic polarizing prism 107, passes through the second polarizing beam splitter 109 and then passes through the polarizing plate 113 for the green wavelength band (G) to illuminate the reflective liquid crystal display elements 116 of the green wavelength band (G). The reflective liquid crystal display element 116 of the green wavelength band (G) modulates polarization of the light based on the image of the green wavelength band (G). The modulated light reflects off the second polarizing beam splitter 109, is subjected to light analysis by the polarizing plate 118 for the green wavelength band (G) and then reflects off the dichroic polarizing prism 110 to reach the projection lens 119.

Figure 9:
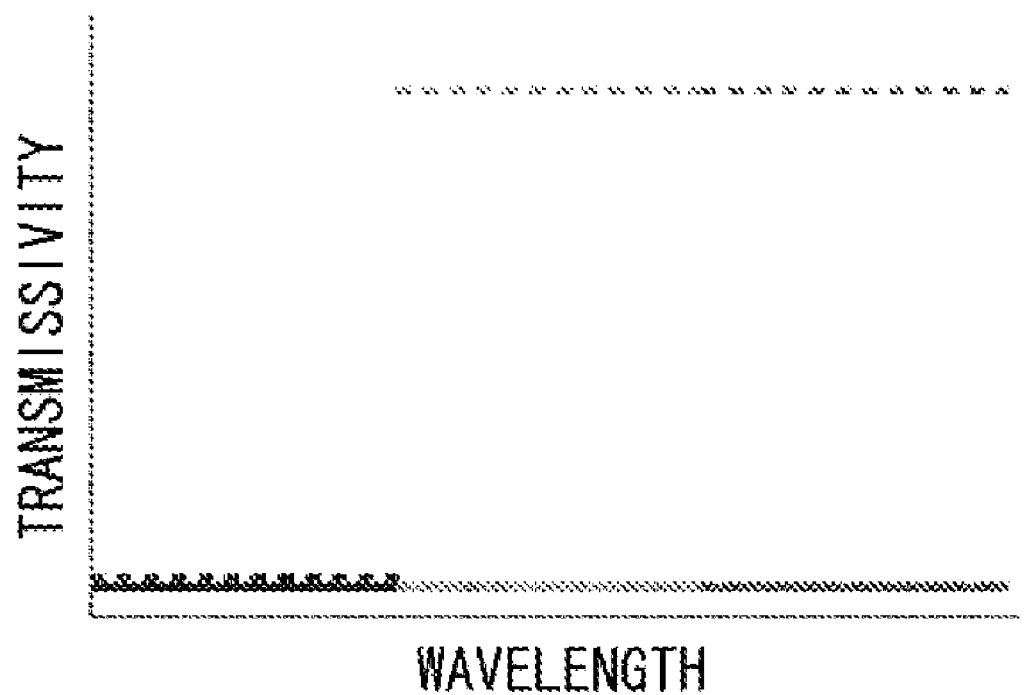
FIG. 9 illustrates the characteristic of a 3P dichroic polarizing prism 24 according to a second exemplary embodiment of the present invention.
Figure 10:
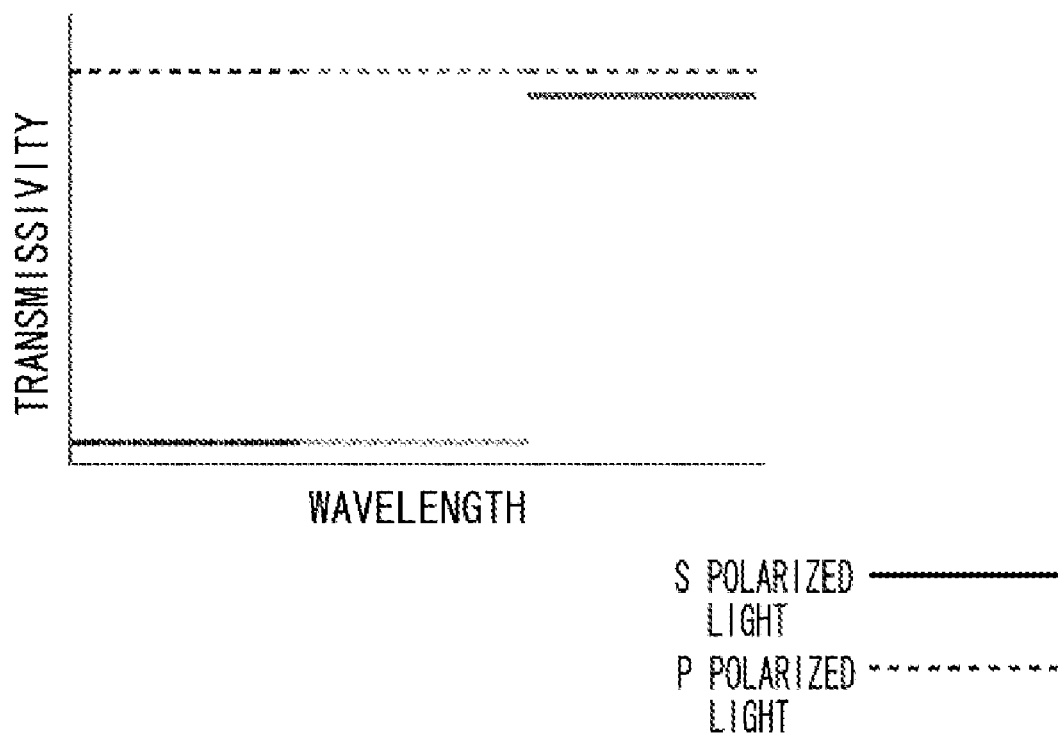
FIG. 10 illustrates the characteristic of a 3P dichroic polarizing prism 25 according to a second exemplary embodiment of the present invention.
Figure 11:
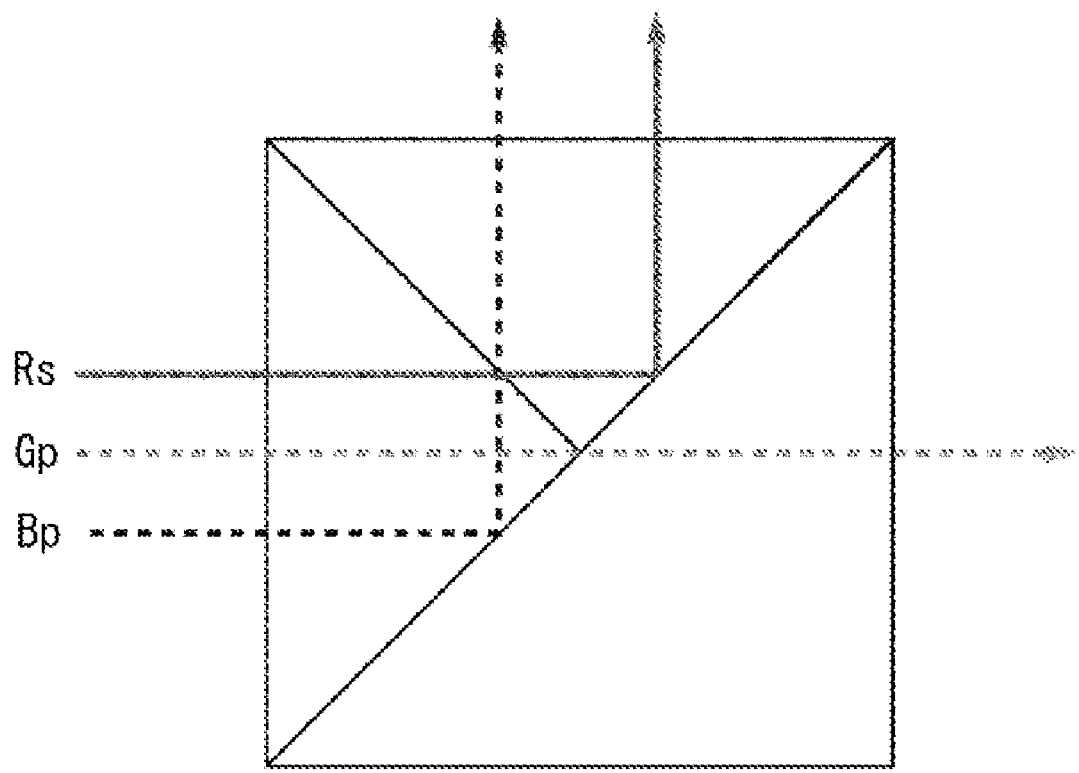
FIG. 11 illustrates a path of normal light in a 3P dichroic polarizing prism according to a second exemplary embodiment of the present invention.

Here, P polarized light in the blue wavelength band (B) and S polarized light in the red wavelength band (R) which are subjected to polarization conversion will be described. The configuration of the 3P dichroic polarizing prism 107 is similar to the first exemplary embodiment of the present invention and only a film characteristic is different. As illustrated in FIGS. 9 and 10, both light reflect off the film A 24 and pass through the film B 25. As illustrated in FIG. 11, both polarized light reflect off the 3P dichroic polarizing prism 107. On the other hand, P polarized light in the green wavelength band (G) passes through both the film A 24 and the film B 25. Accordingly, as illustrated in FIG. 11, the P polarized light passes through the 3P dichroic polarizing prism 107.

Figure 12:
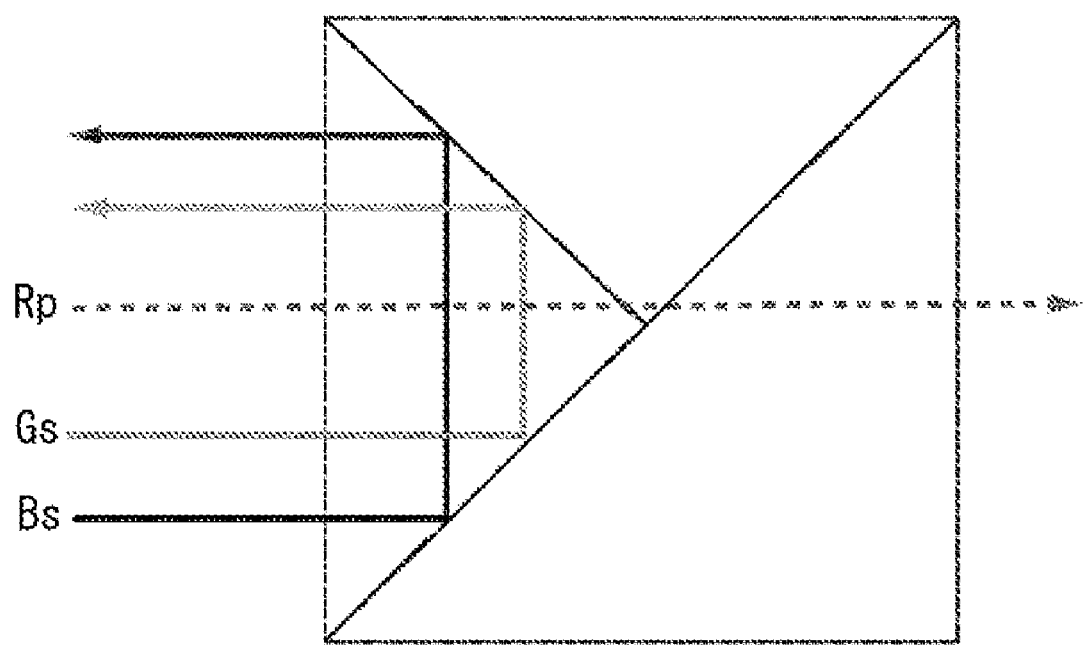
FIG. 12 illustrates a path of unnecessary light in a 3P dichroic polarizing prism according to a second exemplary embodiment of the present invention.

P polarized light in the red wavelength band (R) which is not subjected to polarization conversion, as illustrated in FIGS. 9 and 10, shows a transmissive characteristic at the film A 24 and the film B 25. Accordingly, as illustrated in FIG. 12, the P polarized light in the red wavelength band (R) passes through both the film A 24 and the film B 25. Therefore, the P polarized light in the red wavelength band (R) follows the same light path as the P polarized light in the green wavelength band (G).

Next, it will be described why the S polarized light in the blue wavelength band (B) and the green wavelength band (G), which is unnecessary and is not subjected to polarization conversion, is cut. A configuration of the 3P dichroic polarizing prism 107 is similar to the first exemplary embodiment of the present invention and only a film characteristic is different. As illustrated in FIGS. 9 and 10, in the film A 24 and the film B 25, the S polarized light in the blue wavelength band (B) and the green wavelength band (G) shows a reflective characteristic. Accordingly, as illustrated in FIG. 12, the S polarized light reflects off both the film A 24 and the film B 25. Therefore, the S polarized light returns to the light source 101 side.

As described above, the 3P dichroic polarizing prism 107 simultaneously performs light analysis and color separation. Accordingly, a polarizing plate and a wavelength selective phase plate which are conventionally provided on the light path of the red wavelength band (R) and the blue wavelength band (B), are not required. Accordingly, a projector can be realized in which the light quantity of the blue wavelength band (B) and the red wavelength band (R) is increased so that in a normal mode, the high quality of a bright and white tint are achieved. Therefore, a bright cinema mode can be realized in the cinema mode. If the cinema mode is too bright, the electric power consumption of the light source 101, can be reduced. As a result, a user can operate the projector in a dark cinema mode. In this case, a silence effect is obtained.

On the other hand, also the 3P dichroic polarizing prism 107 has a light analysis function with respect to the light in the green wavelength band (G). Accordingly, the projector can enhance a contrast as compared with a conventional image display apparatus (projector). Further, the present exemplary embodiment can eliminate a very expensive wavelength selective phase plate and polarizing plate. Therefore, the present exemplary embodiment can realize a significant cost reduction and an increase in the light quantity. However, a polarizing plate can also be placed between the 3P dichroic polarizing prism 107 and the second polarizing beam splitter 109.

Further, a trimming filter can be placed between the 3P dichroic polarizing prism 107 and the first polarizing beam splitters 108 and/or between the 3P dichroic polarizing prism 107 and the second polarizing beam splitters 109.

Now, P polarized light of the red wavelength band (R), which is not subjected to polarization conversion, will be described. As described in FIG. 12, the P polarized light in the red wavelength band (R) follows the same light path as the P polarized light in the green wavelength band (G). However, light in the red wavelength band (R) has spectral luminous efficiency which is lower than that in the green wavelength band (G). Accordingly, even if the light in the green wavelength band (G) is slightly mixed with the red wavelength band (R), it does not significantly affect a color tint. Therefore, even if the light in the red wavelength band (R) follows the same path as the light in the green wavelength band (G), a serious problem does not arise compared with the case in which the light in the green wavelength band (G) follows the same light path as the light in the red wavelength band (R).

Consequently, in the exemplary embodiment of the present invention, it is desirable that the 3P dichroic polarizing prism 107 has a function of shielding unnecessary light in the green wavelength band (G) and prevents the light in the green wavelength band (G) from entering a liquid crystal element corresponding to other wavelength bands (or reduces an amount of entering light).

However, the 3P dichroic polarizing prism 107 can also have a function of shielding any unnecessary light in the blue wavelength band (B), the green wavelength band (G) and the red wavelength band (R) based on the emission spectrum of a light source (balance of light quantity in the blue wavelength band (B), the green wavelength band (G) and the red wavelength band (R)), and the other characteristics of the optical system.

Next, a configuration and an optical function of the above-described color selective polarization conversion element 106 will be described in detail referring to FIGS. 19 to 24. On the right side of FIG. 19, a configuration of the color selective polarization conversion element 106 is illustrated. A portion circled by a dotted line constitutes one polarization conversion cell 305*a*, and a plurality of polarization conversion cells 305*a* having the same configuration is provided corresponding to a plurality of lens cells that constitute the lens arrays (fly-eye lens) 103 and 104.

A shielding plate 305*b* is provided on incident surfaces of each polarization conversion cell 305*a*, in the area from a reflection film 331 upward to the adjacent polarization conversion cell. The shielding plate 305*b* shields light incident on the area. As a result, the light is incident only from the area of incident surfaces between the reflection film 331 and a first wavelength selective polarization separation film 332, which will be described below.

Figure 19:
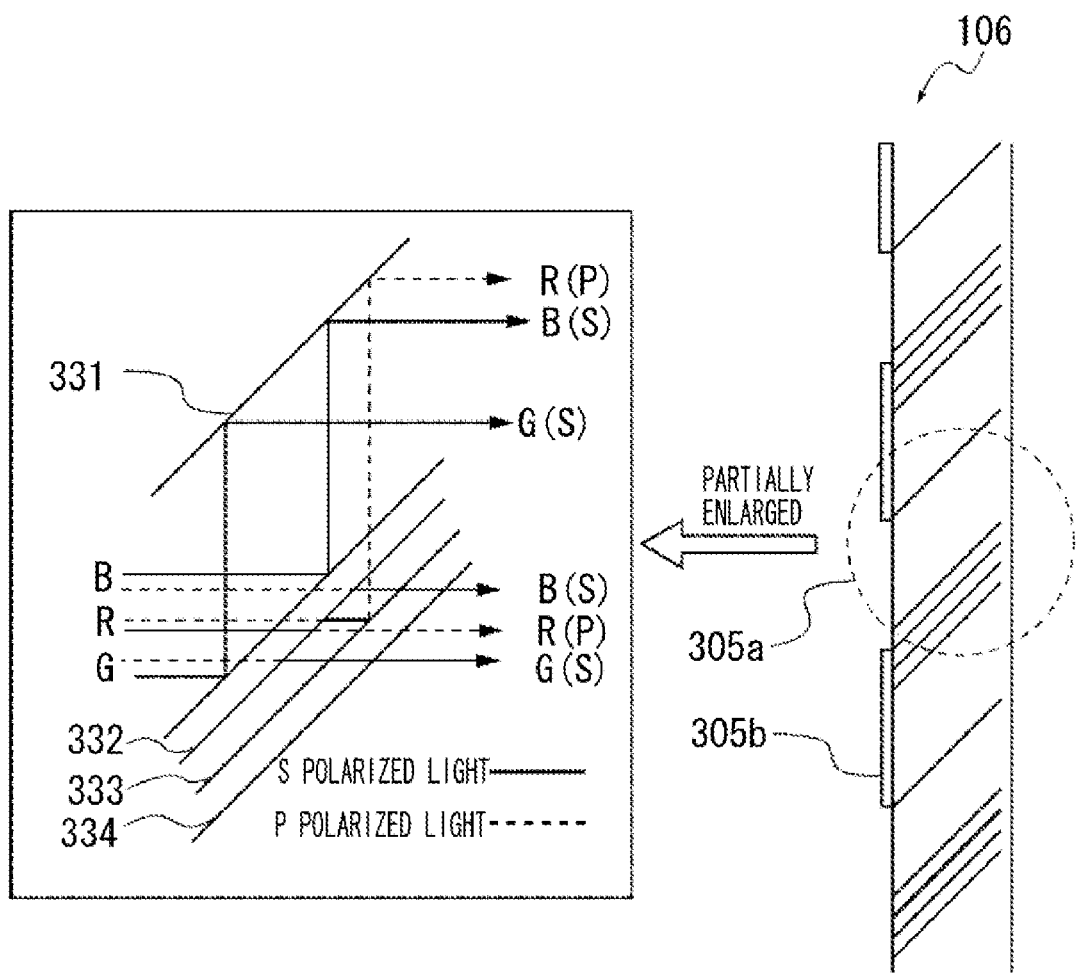
FIG. 19 is a cross sectional view illustrating a wavelength selective polarization conversion element according to a second exemplary embodiment of the present invention.

On the left side in FIG. 19, one polarization conversion cell 305*a* is enlarged and schematically illustrated. The polarization conversion cell 305*a* includes the above-described reflection film 331, a first wavelength selective polarization separation film (light separation film) 332, a phase difference plate 333, and a second wavelength selective polarization separation film (light separation film) 334 in this order from the light incident side. Hereafter, a wavelength selective polarization separation film is simply abbreviated as a light separation film.

The first light separation film 332, the phase difference plate 333 and the second light separation film 334 inclines at an angle of 45 degrees to a direction of an incident optical axis (i.e., direction from left side to right side in FIG. 19). Further, the reflection film 331 is placed parallel to the first light separation film 332. Furthermore, each light separation film is formed as a multi-layer film on the surface of a substrate made of glass or an acrylic resin which is practically a parallel flat plate. In addition, the phase difference plate 333 is formed film-like and bonded on a similar substrate.

Figure 20:
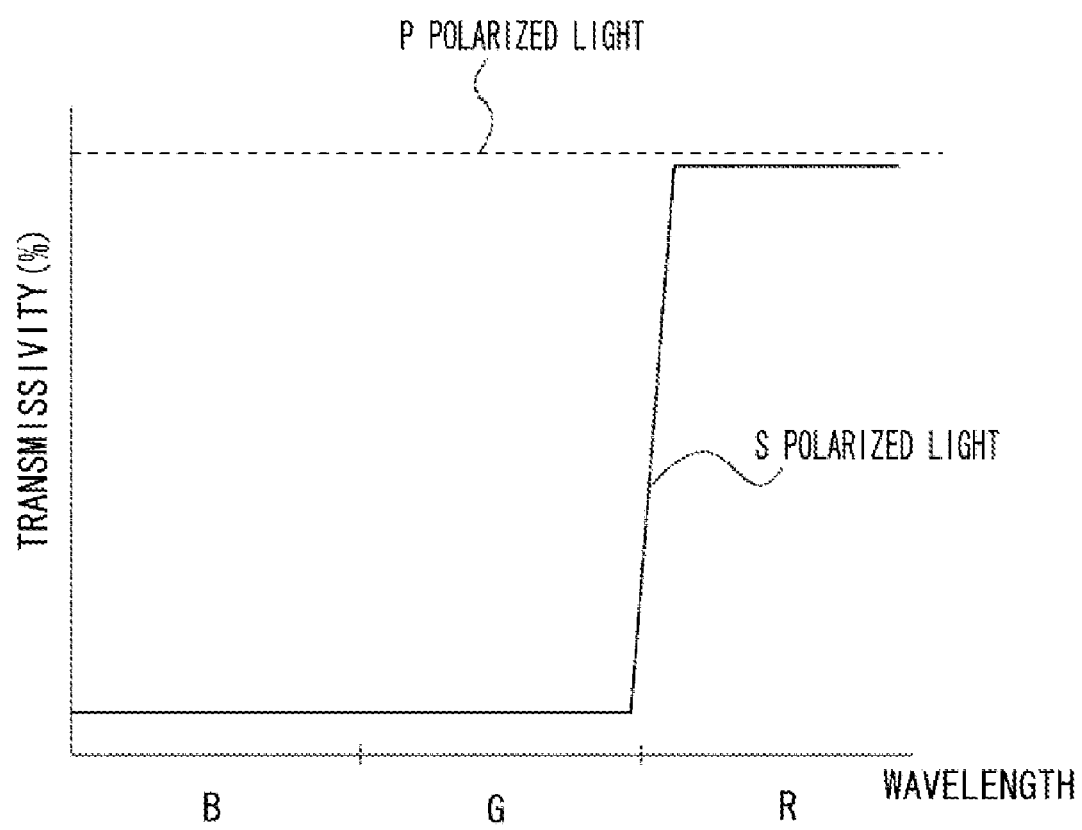
FIG. 20 illustrates the characteristic of a first light separation film 332.
Figure 21:
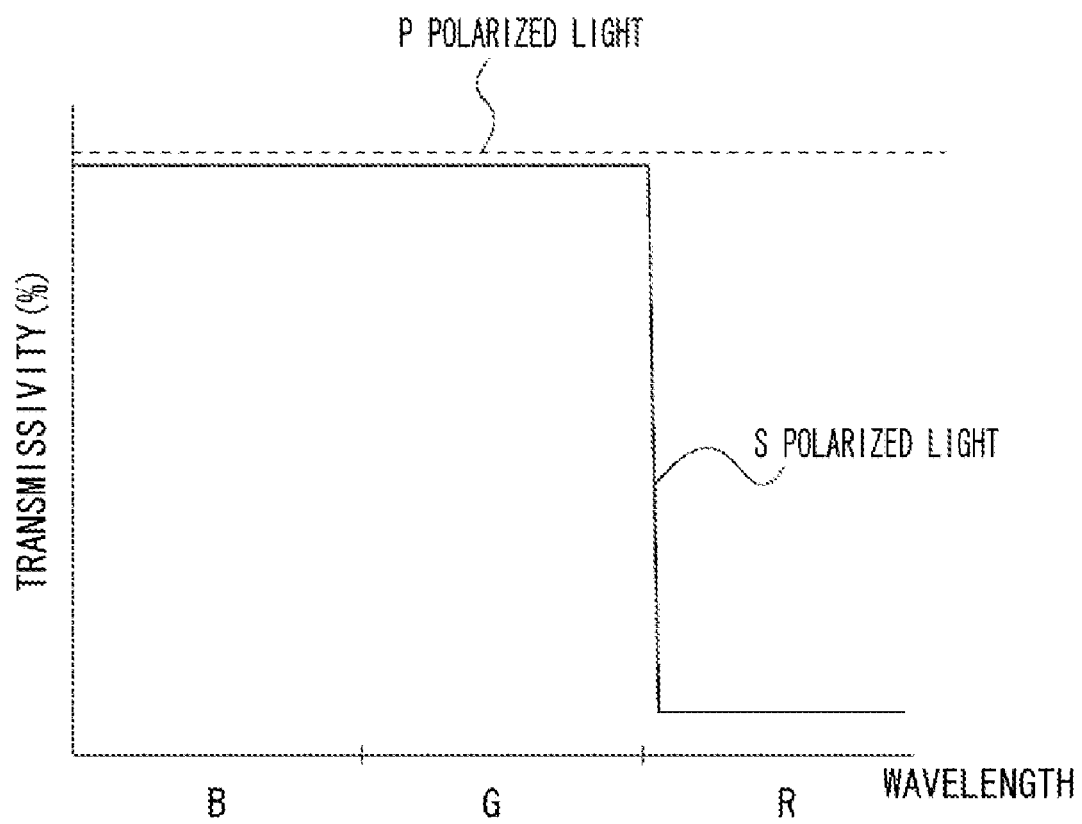
FIG. 21 illustrates the characteristic of a second light separation film 334.

The characteristics of the first light separation film 332 and the second light separation film 334 are illustrated in FIGS. 20 and 21 respectively. The first light separation film 332 has a transmittance of 0% or close to 0% (lower than 50%) with respect to S polarized light of the blue wavelength band (B) and the green wavelength band (G), and a transmittance of 100% or close to 100% (higher than 50%) with respect to S polarized light of the red wavelength band (R). On the other hand, the second light separation film 334 has a transmittance of 100% or close to 100% (higher than 50%) with respect to S polarized light of the blue wavelength band (B) and the green wavelength band (G), and a transmittance of 0% or close to 0% (lower than 50%) with respect to S polarized light of the red wavelength band (R). That is, the first and the second light separation films 332 and 334 have characteristics that a transmittance with respect to S polarized light is opposite to each other according to a wavelength band.

The first and the second light separation films 332 and 334 have a transmittance of 100% or close to 100% (higher than 50%) with respect to P polarized light irrespective of the wavelength band.

Further, the phase difference plate 333 is a ½ wavelength plate and has a function of rotating the direction of polarization of incident linear polarized light at 90 degrees.

White unpolarized light is incident on the color selective polarization conversion element 106 from the left side in FIG. 19. P polarized light in the blue wavelength band (B) and the green wavelength band (G) of the unpolarized light passes through the first light separation film 332 and through the phase difference plate 333 to be converted into S polarized light. Then, the converted S polarized light passes through the second light separation film 334 and is emitted from the color selective polarization conversion element 106 as S polarized light.

Also, S polarized light in the blue wavelength band (B) and the green wavelength band (G) reflects off the first light separation film 332 and further, reflects off the reflection film 331 and is emitted from the color selective polarization conversion element 106 as S polarized light.

Also, P polarized light in the red wavelength band (R) passes through the first light separation film 332 and through the phase difference plate 333 to be converted into S polarized light. The converted S polarized light reflects off the second light separation film 334. Then, this reflected light passes through the phase difference plate 333 again and is converted into P polarized light. The converted P polarized light passes through the first light separation film 332 and reflects off the reflection film 331 and is emitted from the color selective polarization conversion element 106 as P polarized light.

Further, S polarized light in the red wavelength band (R) passes through the first light separation film 332 and through the phase difference plate 333 to be converted into P polarized light. The converted P polarized light passes through the second light separation film 334 and is emitted from the color selective polarization conversion element 106 as P polarized light.

As described above, white unpolarized light incident on the color selective polarization conversion element 106 which is formed as a single element, is converted into S polarized light in the blue wavelength band (B) and the green wavelength band (G), and P polarized light in the red wavelength band (R), and emitted from the color selective polarization conversion element 106.

Accordingly, the light in the blue wavelength band (B) and in the red wavelength band (R) can be led from the color selective polarization conversion element 106 to the first polarizing beam splitter 108 through the 3P dichroic polarizing prism 107 without going through the conventionally used wavelength selective phase difference plate.

FIG. 22 illustrates as the multi-layer film the configuration of the first and second light separation films 332 and 334 which are described in FIGS. 20 and 21. Both the first and second light separation films 332 and 334 employ PBH56 made by Ohara Co. Ltd. as a glass substrate. In FIG. 22, a high refractive index layer is represented by H, a medium refractive index layer by M and a low refractive index layer by L. A figures on the left side of the high refractive index layer H, the medium refractive index layer M and the low refractive index layer L indicate the thickness (nm) of each layer (film). According to the exemplary embodiment of the present invention, $TiO_2$ is employed as a high refractive index layer, $Al_2O_3$ as a medium refractive index layer and $SiO_2$ as a low refractive index layer.

Figure 23:
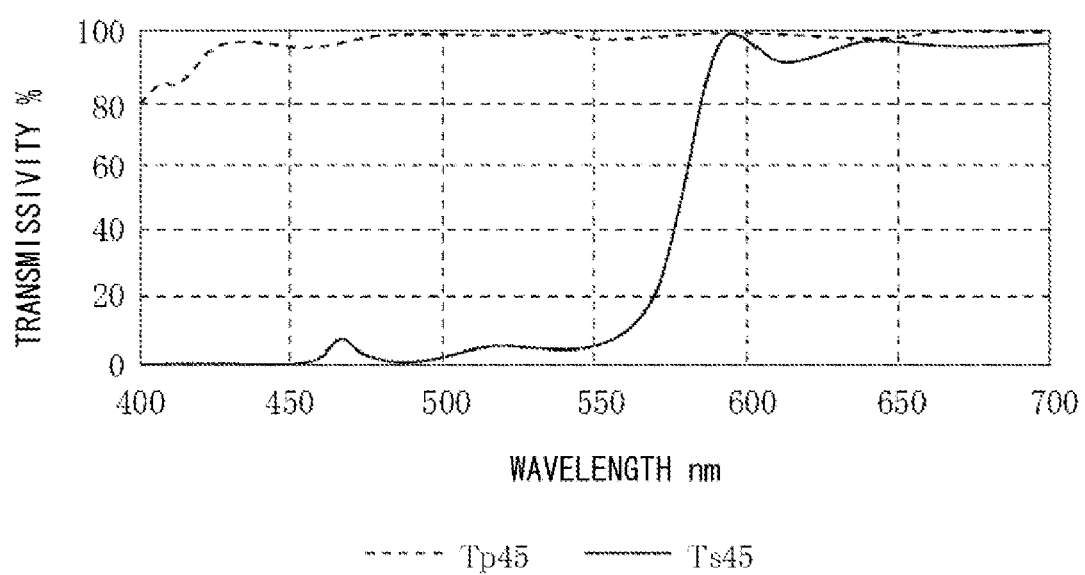
FIG. 23 illustrates the characteristic of a first light separation film based on a film configuration in FIG. 22.
Figure 24:
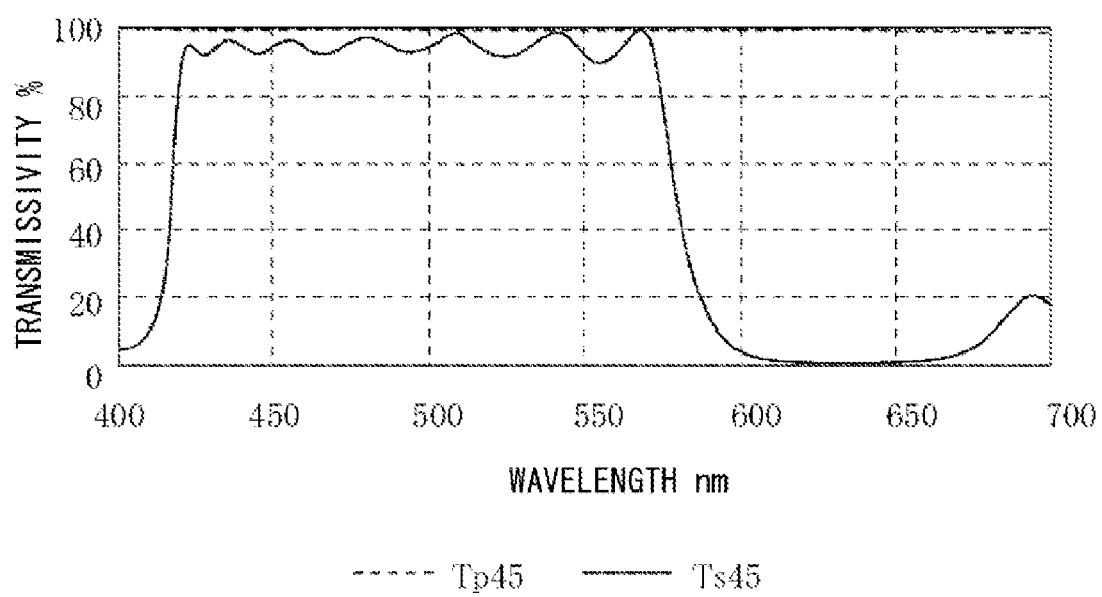
FIG. 24 illustrates the characteristic of a second light separation film based on a film configuration in FIG. 22.

FIGS. 23 and 24 show the transmittance data of the first and second light separation films 332 and 334 having a film configuration illustrated in FIG. 22 respectively. Tp45 indicates a transmittance when P polarized light is incident at an angle of 45 degrees with respect to the first and second light separation films 332 and 334. Ts45 indicates a transmittance when S polarized light is incident at an angle of 45 degrees with respect to the first and second light separation films 332 and 334.

Third Exemplary Embodiment

Figure 13:
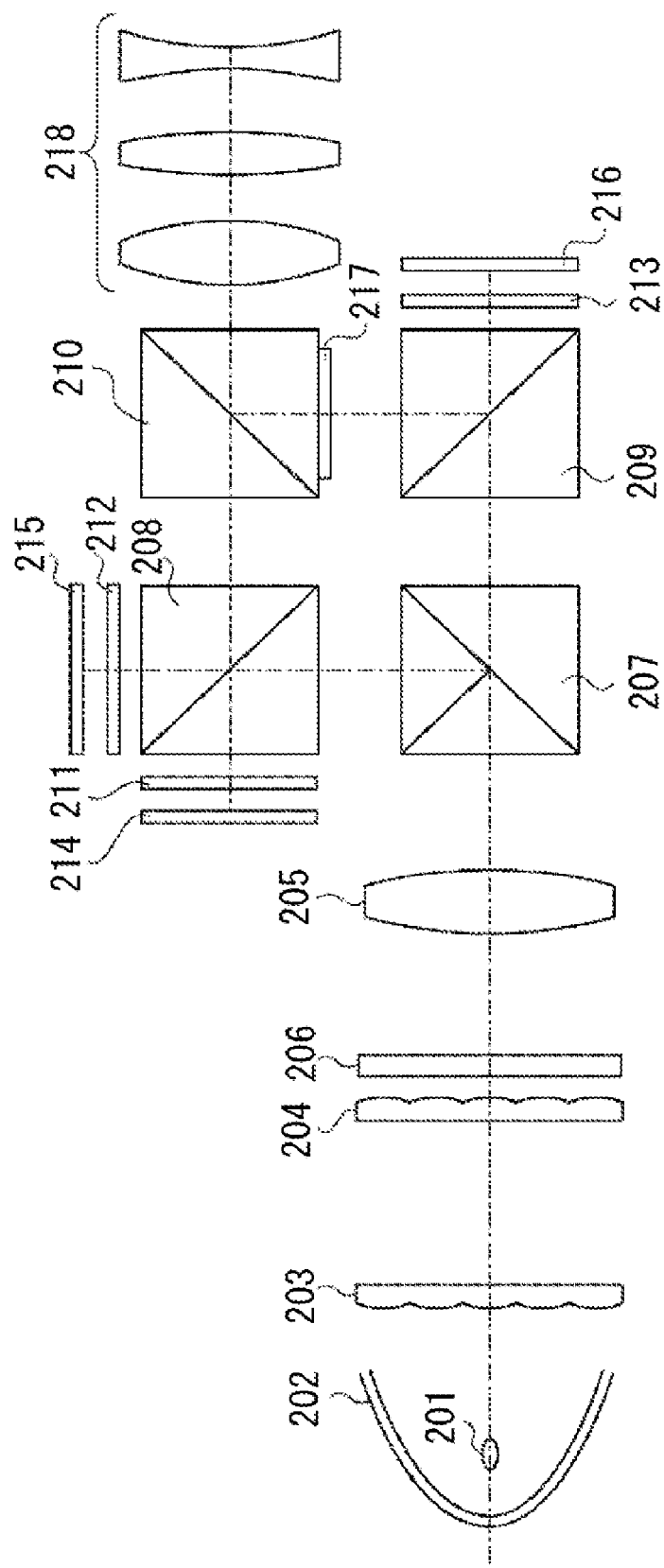
FIG. 13 is a diagram illustrating an optical system according to a third exemplary embodiment of the present invention.
Figure 14:
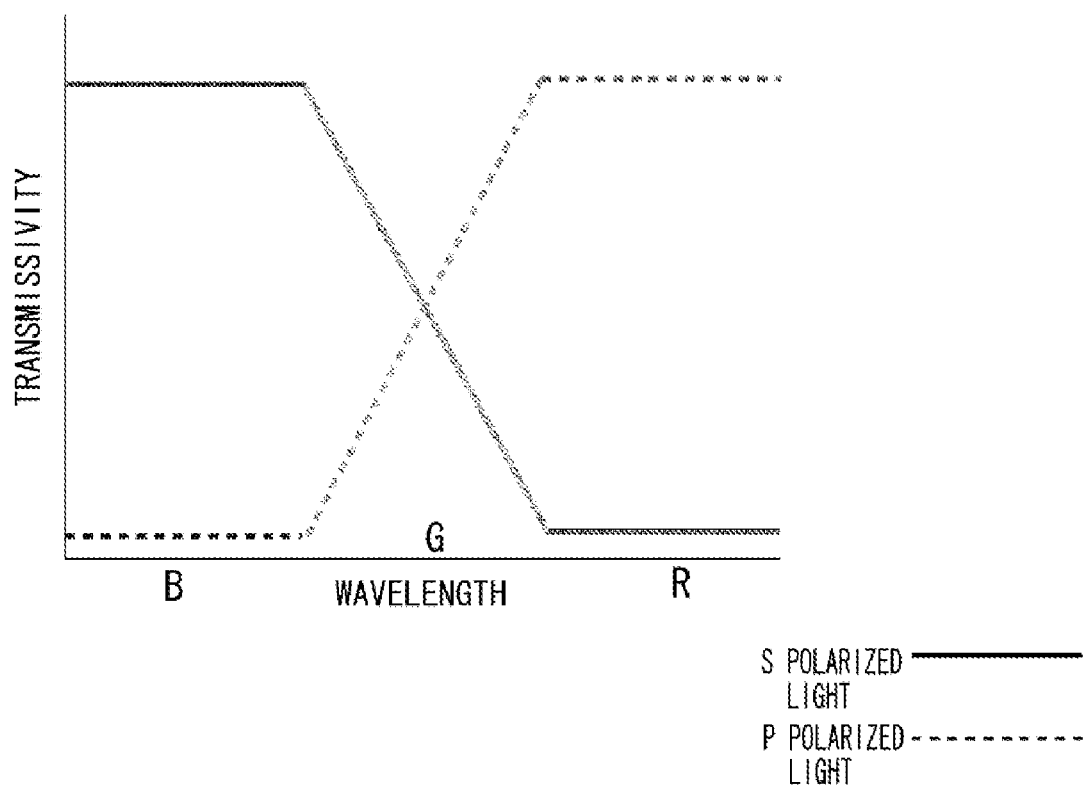
FIG. 14 illustrates the characteristic of a polarizing prism according to a third exemplary embodiment of the present invention.

FIG. 13 illustrates an optical system according to a third exemplary embodiment of the present invention. In FIG. 13, the optical system includes a light source 201, a reflector 202, a first lens array 203 formed of a plurality of lenses, a second lens array 204 formed of a plurality of lenses, a condenser lens 205, a color selective polarization conversion element 206, a 3P dichroic polarizing prism 207, a polarizing prism 208, a first polarizing beam splitter 209 (hereafter, referred to as PBS), a second polarizing beam splitter 210, phase plates 211, 212 and 213, reflective liquid crystal display elements 214, 215 and 216, a polarizing plate 217, and a projection lens 218. The color selective polarization conversion element 206 uniformly converts a blue wavelength band (B) and a red wavelength band (R) of white unpolarized light to S polarized light, and uniformly converts a green wavelength band (G) to P polarized light. The 3P dichroic polarizing prism 207 has a color separation function and a light analysis function. The polarizing prism 208 shows a characteristic illustrated in FIG. 14 and reflects P polarized light in the blue wavelength band (B), passes S polarized light, passes P polarized light in red wavelength band (R), and reflects S polarized light. The phase plates 211, 212 and 213 are optimized to the wavelength of illumination light. The reflective liquid crystal display elements 214, 215 and 216 display the image of a red wavelength band (R), a blue wavelength band (B), and a green wavelength band (G).

The blue wavelength band (B) and the red wavelength band (R) of S polarized light (S polarized light to PBS film), and the green wavelength band (G) of P polarized light (P polarized light to PBS film) converted by the color selective polarization conversion element 206 are incident on the 3P dichroic polarizing prism 207. Further, the red wavelength band (R) and the blue wavelength band (B) of P polarized light (unnecessary light), and the green wavelength band (G) of S polarized light (unnecessary light) which are not subjected to polarization conversion are incident on the 3P dichroic polarizing prism 207. The S polarized light of the green wavelength band (G) which is not subjected to polarization conversion, is cut by the 3P dichroic polarizing prism 207. Also, P polarized light of the red wavelength band (R) and the blue wavelength band (B) which are not subjected to polarization conversion, passes through the 3P dichroic polarizing prism 207 to the light path of the green wavelength band (G).

On the other hand, the red wavelength band (R) of S polarized light subjected to polarization conversion reflects off the 3P dichroic polarizing prism 207, reflects off the polarizing prism 208 and passes through the phase plate 211 for the red wavelength band (R) to illuminate the reflective liquid crystal display elements 214 for the red wavelength band (R). The reflective liquid crystal display element 214 of the red wavelength band (R) modulates polarization of the light based on the image in the red wavelength band (R). The modulated light passes through the polarizing prism 208 and the second polarizing beam splitter 210 to reach the projection lens 218.

Then, the S polarized light component in the blue wavelength band (B) reflects off the 3P dichroic polarizing prism 207, passes through the polarizing prism 208 and through the phase plate 212 for the blue wavelength band (B) to illuminate the reflective liquid crystal display element 215 for the blue wavelength band (B). The reflective liquid crystal display element 215 of the blue wavelength band (B) modulates polarization of light based on the image in the blue wavelength band (B). The modulated light reflects off the polarizing prism 208 and passes through the second polarizing beam splitter 210 to reach the projection lens 218.

The P polarized light component in the green wavelength band (G) passes through the 3P dichroic polarizing prism 207, through the first polarizing beam splitter 209 and through the phase plate 213 for the green wavelength band (G) to illuminate the reflective liquid crystal display element 216 for the green wavelength band (G). The reflective liquid crystal display element 216 of the green wavelength band (G) modulates polarization of the light based on the image in the green wavelength band (G). The modulated light reflects off the first polarizing beam splitter 209, is subjected to light analysis by the polarizing plate 217 for the green wavelength band (G) and reflects off the second polarizing beam splitter 210 to reach the projection lens 218.

Figure 15:
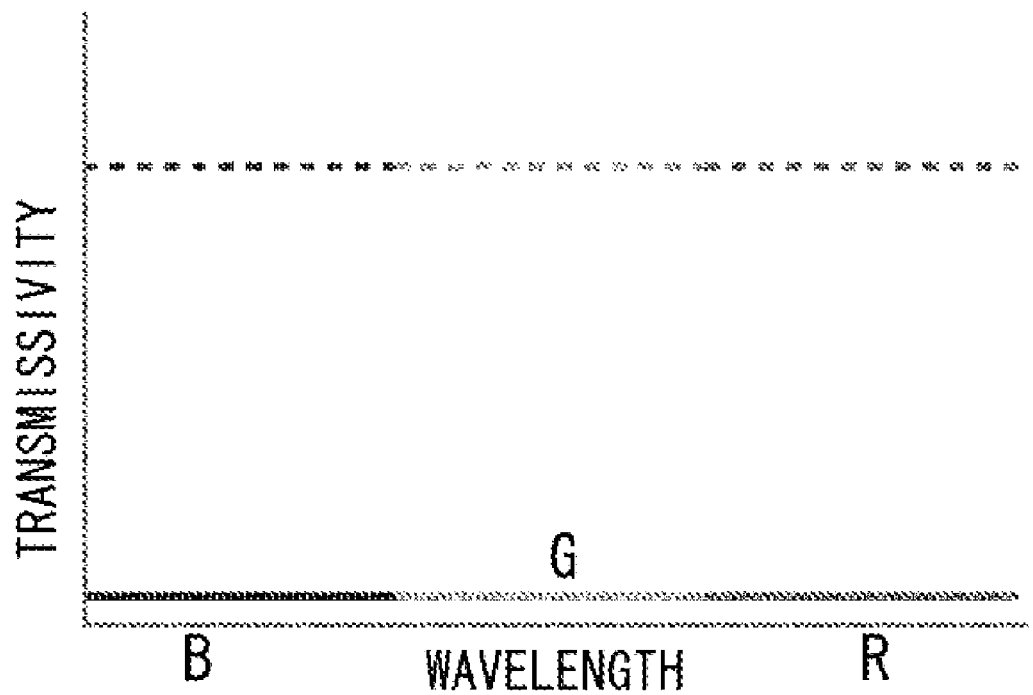
FIG. 15 illustrates the characteristic of a 3P dichroic polarizing prism 24 according to a third exemplary embodiment of the present invention.
Figure 16:
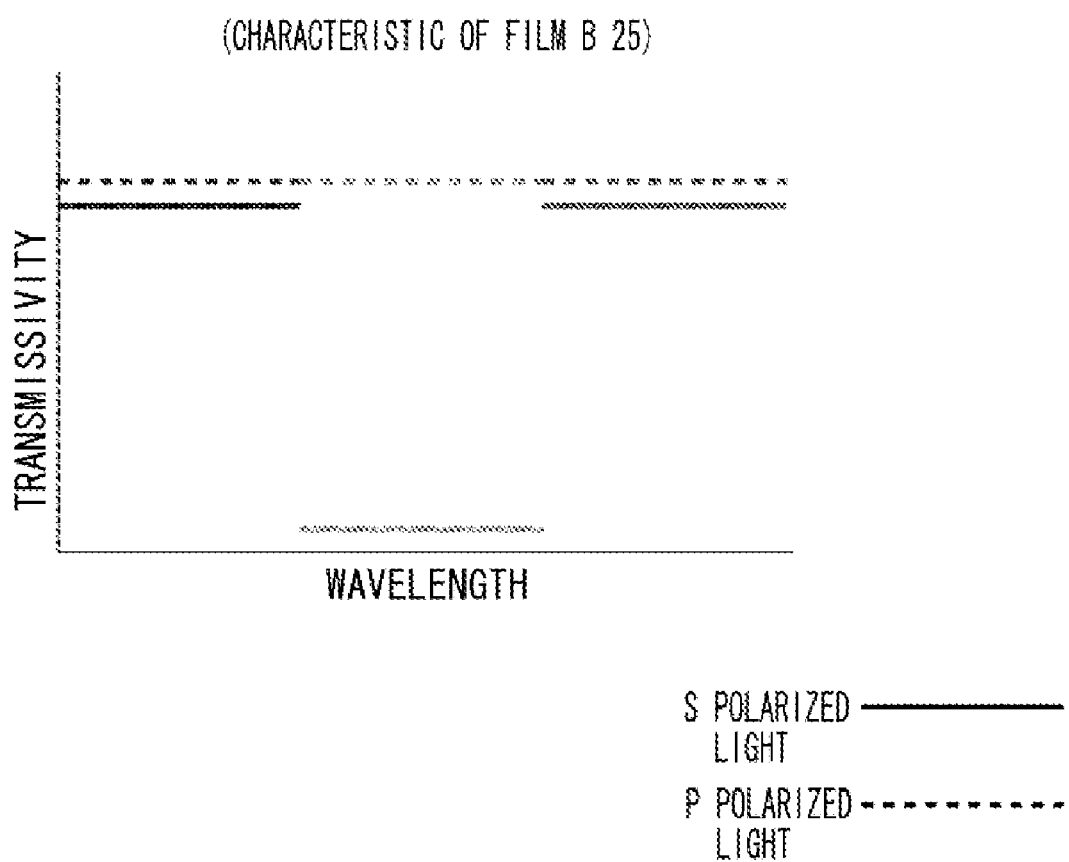
FIG. 16 illustrates the characteristic of a 3P dichroic polarizing prism 25 according to a third exemplary embodiment of the present invention.
Figure 17:
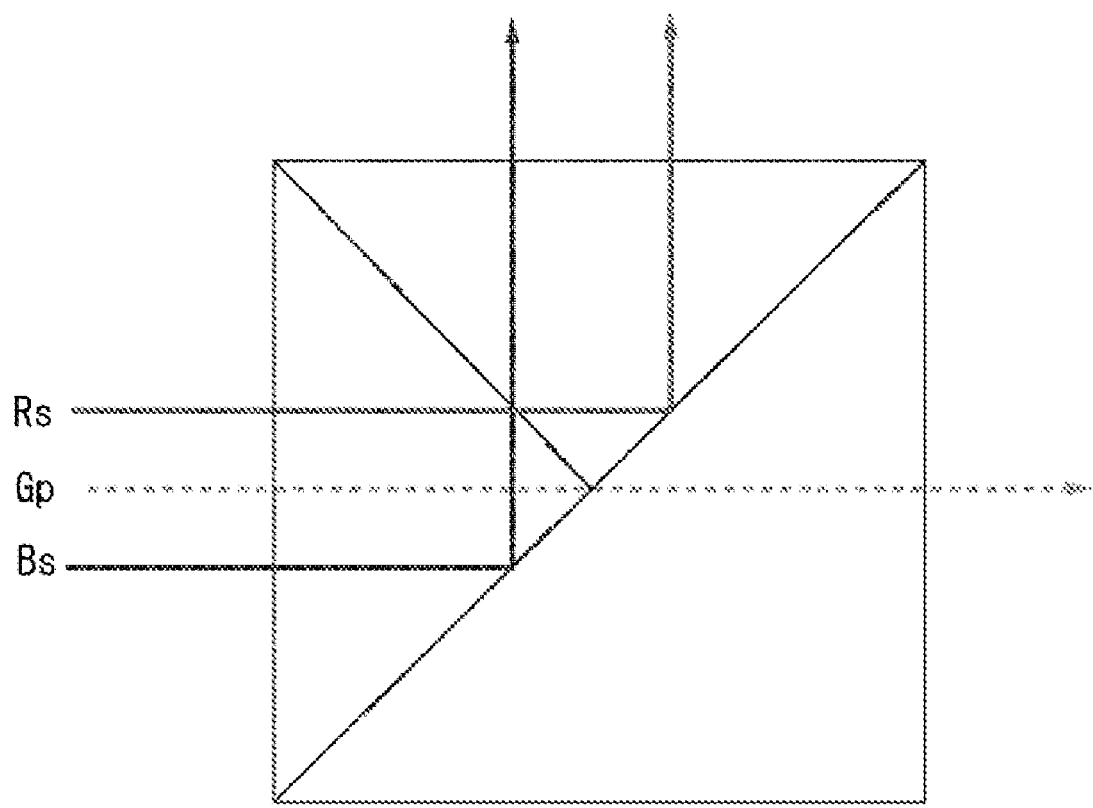
FIG. 17 illustrates a path of normal light in a 3P dichroic polarizing prism according to a third exemplary embodiment of the present invention.

Here, S polarized light of the blue wavelength band (B) and the red wavelength band (R) subjected to polarization conversion will be described. The configuration of the 3P dichroic polarizing prism 207 is similar to the first exemplary embodiment of the present invention and different only in a film characteristic. The characteristics of the film A 24 and the film B 25 are illustrated in FIGS. 15 and 16. Both light reflect off the film A 24 and pass through the film B 25. Therefore, as illustrated in FIG. 17, both light reflect off the 3P dichroic polarizing prism 207. On the other hand, P polarized light in the green wavelength band (G) passes through both the film A 24 and the film B 25, therefore, as illustrated in FIG. 17, passes through the 3P dichroic polarizing prism 207.

Figure 18:
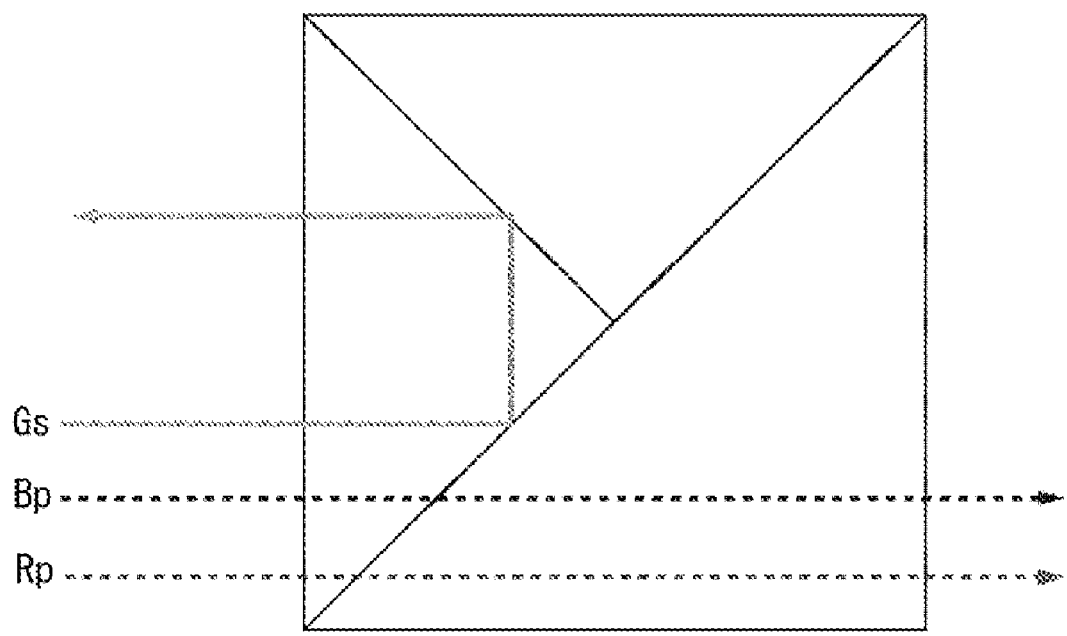
FIG. 18 illustrates a path of unnecessary light in a 3P dichroic polarizing prism according to a third exemplary embodiment of the present invention.

Next, it will be described why S polarized light in the green wavelength band (G), which is not subjected to polarization conversion, is analyzed. As illustrated in FIGS. 15 and 16, the S polarized light in the green wavelength band (G) shows a reflective characteristic in the film A 24 and the film B 25. Accordingly, as illustrated in FIG. 18, the S polarized light reflects off both the film A 24 and the film B 25. Therefore, the S polarized light returns to the light source 201.

Now, P polarized light in the blue wavelength band (B) and the red wavelength band (R) which is not subjected to polarization conversion, is described. As illustrated in FIGS. 15 and 16, the film A 24 and the film B 25 transmits P polarized light in the blue wavelength band (B) and the red wavelength band (R). Therefore, as illustrated in FIG. 18, P polarized light in the red wavelength band (R) passes through the film A 24 and the film B 25 to follow the same light path as P polarized light in the green wavelength band (G). Light in the blue wavelength band (B) and the red wavelength band (R) has spectral luminous efficiency lower than the green wavelength band (G). Accordingly, even if the light in the blue wavelength band (B) and the red wavelength band (R) is slightly mixed with the light in the green wavelength band (G), it does not significantly affect a color tint. Therefore, even if the light in the blue wavelength band (B) and the red wavelength band (R) follows the same light path of the green wavelength band (G), a serious problem does not arise as compared with the case in which the light in the green wavelength band (G) follows the same light path as the light in the blue wavelength band (B) and the red wavelength band (R). Accordingly, in the exemplary embodiment of the present invention, it is useful that a 3P dichroic polarizing prism 207 has a function of shielding unnecessary light in the green (G) band.

However, the 3P dichroic polarizing prism 207 can have a function of shielding any unnecessary light in the blue wavelength band (B), the green wavelength band (G), and the red wavelength band (R) based on the emission spectrum of a light source (e.g., balance of light quantity in the blue wavelength band (B), the green wavelength band (G), and the red wavelength band (R)) and the other characteristics of optical systems.

As described above, the 3P dichroic polarizing prism 207 simultaneously performs light analysis and color separation. Therefore, a polarizing plate and a wavelength selective phase plate are not required. Conventionally, the polarizing plate was provided in the light path of the red wavelength band (R) and the blue wavelength band (B). Accordingly, a projector can be realized in which the light quantity in the blue wavelength band (B) and the red wavelength band (R) is increased so that in a normal mode, the high quality of a bright and white tint are achieved. Therefore, a bright cinema mode can be realized in the cinema mode. If the cinema mode is too bright, the electric consumption of the light source 201 can be reduced and a user can operate the projector in a dark cinema mode. In this case, a silence effect is obtained.

On the other hand, in the light path of the green wavelength band (G), also the 3P dichroic polarizing prism 207 performs light analysis. Accordingly, the projector can enhance a contrast as compared with a conventional projector. Further, the exemplary embodiment of the present invention can eliminate a expensive wavelength selective phase plate and a polarizing plate. Therefore, a significant cost reduction and an increase in light quantity can be realized. Moreover, a polarizing plate can be placed between the 3P dichroic polarizing prism 207 and the polarizing prism 208, and between the 3P dichroic polarizing prism 207 and the first polarizing beam splitter 209.

Further, a trimming filter can be placed between the 3P dichroic polarizing prism 207 and the polarizing prism 208, and/or between the 3P dichroic polarizing prism 207 and the first polarizing beam splitter 209.

According to the above-described exemplary embodiment of the present invention, the following effect can be obtained. Conventionally, in order to make projector bright, orange light is increased, so that a y value of a white wavelength band (on chromaticity coordinates) becomes higher. However, according to the exemplary embodiment of the present invention, light quantity of a blue wavelength band (B) can be increased and the y value of the white wavelength band can be decreased.

On the contrary, if a color reproduction area is broadened, orange light is cut so that an x value of the white wavelength band becomes lower. For this reason, in order to increase the x value, conventionally, cyanogen is cut. However, according to the exemplary embodiment of the present invention the light quantity of a red wavelength band (R) can be increased so that the amount of cyanogen does not need to be decreased so much. Therefore, the color reproduction area can be broadened without reducing brightness.

Furthermore, the exemplary embodiment of the present invention can also be applied to an image display system that combines the image display apparatus (projector) according to the above exemplary embodiment with a unit configured to supply an image signal to the image display apparatus (image signal supply unit). The image signal supply unit includes an image pickup device such as a still camera and a video camera, and a television antenna, a computer as well as an image reproduction device such as a video tape recorder, a digital versatile disc (DVD) player and a game machine.

As described above, the exemplary embodiment of the present invention can depress reduction in contrast caused by certain color light which is incident on a liquid crystal element of other colors.

While the present invention has been described with reference to exemplary embodiments, it is to be understood that the invention is not limited to the disclosed exemplary embodiments. The scope of the following claims is to be accorded the broadest interpretation so as to encompass all modifications, equivalent configurations, and functions.

This application claims priority from Japanese Patent Application No. 2006-270658 filed Oct. 2, 2006, which is hereby incorporated by reference herein in its entirety.

What is claimed is:

1. An image display apparatus comprising:
 a first liquid crystal display element corresponding to first color light;
 a second liquid crystal display element corresponding to second color light different in wavelength band from the first color light;
 a third liquid crystal display element corresponding to third color light different in wavelength band from the first color light and the second color light;
 a polarization conversion element which converts the second color light of unpolarized light emitted from a light source into a first linear polarized light; and
 a light path separation element which separates the second color light from the first and third color light which are emitted from the polarization conversion element,
 wherein an image is displayed by illuminating the first, the second and the third liquid crystal display elements with the first, the second and the third color light emitted from the light source and passed through the light path separation element,
 wherein the light path separation element leads a first linear polarized light component of the second color light from the light source to the second liquid crystal display element,
 wherein the light path separation element leads a second linear polarized light component whose direction of the polarization is orthogonal to the first linear polarized light component of the second color light from the light source, in a direction different from any of the first, the second and the third liquid crystal display elements, and
 wherein the light path separation element returns the light of the second linear polarized light component of the second color light along the light path of a beam going from the polarization conversion element to the light path separation element.

2. The image display apparatus according to claim 1, wherein the polarization conversion element converts either the first color light or the third color light of unpolarized light from the light source, into the second linear polarized light and converts other color light into the first linear polarized light.

3. The image display apparatus according to claim 1, further comprising:
 a first polarizing beam splitter placed between the light path separation element and the second liquid crystal display element, wherein the second color light emitted from the light path separation element is incident on the first polarizing beam splitter without going through a polarizing plate.

4. The image display apparatus according to claim 1, further comprising:
 a second polarizing beam splitter placed between the light path separation element, and the first and the third liquid crystal display elements, wherein the first and the third color light emitted from the light path separation element are incident on the second polarizing beam splitter without going through a polarizing plate.

5. The image display apparatus according to claim 1, wherein the light path separation element includes first, second, and third prisms, wherein a first optical structure is provided between the first and the second prisms, and
 wherein a second optical structure having a characteristic different from the first optical structure is provided between the first and the third prisms, and between the second and the third prisms.

6. The image display apparatus according to claim 5, wherein the first optical structure has a polarization separation characteristic with respect to all of the first, the second, and the third color light; and
 wherein the second optical structure has a polarization separation characteristic with respect to the second color light, and a reflective or a transmissive characteristic regardless of the direction of polarization with respect to the first and the third color light.

7. The image display apparatus according to claim 5, wherein the first and the second prisms have the same shape, and
 wherein the third prism has a shape formed by bonding the first and the second prisms together.

8. An image display apparatus comprising:
 a first liquid crystal display element corresponding to first color light;
 a second liquid crystal display element corresponding to second color light different in wavelength band from the first color light;
 a third liquid crystal display element corresponding to third color light different in wavelength band from the first color light and the second color light;
 a polarization conversion element which converts the second color light of unpolarized light emitted from a light source into a first linear polarized light; and
 a light path separation element which separates the second color light from the first and third color light which are emitted from the polarization conversion element,
 wherein an image is displayed by illuminating the first, the second and the third liquid crystal display elements with the first, the second and the third color light emitted from the light source and passed through the light path separation element,
 wherein the light path separation element leads a first linear polarized light component of the second color light from the light source to the second liquid crystal display element,
 wherein the light path separation element leads a second linear polarized light component whose direction of the polarization is orthogonal to the first linear polarized light component of the second color light from the light source, in a direction different from any of the first, the second and the third liquid crystal display elements, and
 wherein the light path separation element returns the light of the second linear polarized light component of the second color light along the light path of a beam going from the polarization conversion element to the light path separation element;

the light path separation element comprising:
a first prism;
a second prism; and
a third prism;
wherein the first and the second prisms have the same shape,
wherein the third prism has a shape formed by bonding the first and the second prism together,
wherein a first optical structure is provided between the first and the second prisms, and
wherein a second optical structure having a characteristic different from the first optical structure is provided between the first and the third prisms, and between the second and the third prisms.

9. The image display apparatus according to claim 8,
wherein the first and the second prisms have planes of the same size in shape of a right-angled isosceles triangle, and the third prism has a plane of the different size from the first and the second prisms in shape of the right-angled isosceles triangle,
wherein the first and the second prisms are bonded together to join right-angled portions to each other, and
wherein right-angled portions of the first and the second prisms, and a hypotenuse portion of the third prism are bonded together.

* * * * *